United States Patent
Kercher et al.

(10) Patent No.: US 11,807,543 B2
(45) Date of Patent: Nov. 7, 2023

(54) IONICALLY CONDUCTIVE POWDERS AND FILMS, AND METHODS OF PREPARATION

(71) Applicant: UT-Battelle, LLC, Oak Ridge, TN (US)

(72) Inventors: Andrew K. Kercher, Oak Ridge, TN (US); Andrew S. Westover, Knoxville, TN (US); Michael Naguib Abdelmalak, Metairie, LA (US); Nancy J. Dudney, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 453 days.

(21) Appl. No.: 16/944,293

(22) Filed: Jul. 31, 2020

(65) Prior Publication Data

US 2021/0032117 A1     Feb. 4, 2021

Related U.S. Application Data

(60) Provisional application No. 62/882,029, filed on Aug. 2, 2019.

(51) Int. Cl.
*C01D 15/02* (2006.01)
*H01M 10/0562* (2010.01)
(Continued)

(52) U.S. Cl.
CPC ............ *C01D 15/02* (2013.01); *C01B 33/325* (2013.01); *H01M 4/505* (2013.01); *H01M 4/525* (2013.01);
(Continued)

(58) Field of Classification Search
CPC ...... C01D 15/02; C01B 33/325; H01M 4/505; H01M 4/525; H01M 4/583; H01M 6/187;
(Continued)

(56) References Cited

U.S. PATENT DOCUMENTS

| 5,338,625 A | 8/1994 | Bates et al. |
| 7,514,181 B2 | 4/2009 | Ugaji et al. |

(Continued)

FOREIGN PATENT DOCUMENTS

JP        6534078 B1      6/2019

OTHER PUBLICATIONS

"Isotropic", Cambridge English Dictionary, 2023. (Year: 2023).*
(Continued)

*Primary Examiner* — Coris Fung
*Assistant Examiner* — Catriona M Corallo
(74) *Attorney, Agent, or Firm* — Scully, Scott, Murphy & Presser, P.C.

(57) ABSTRACT

A solid ionically conductive composition (e.g., nanoparticles of less than 1 micron or a continuous film) comprising at least one element selected from alkali metal, alkaline earth metal, aluminum, zinc, copper, and silver in combination with at least two elements selected from oxygen, sulfur, silicon, phosphorus, nitrogen, boron, gallium, indium, tin, germanium, arsenic, antimony, bismuth, transition metals, and lanthanides. Also described is a battery comprising an anode, a cathode, and a solid electrolyte (corresponding to the above ionically conductive composition) in contact with or as part of the anode and/or cathode. Further described is a thermal (e.g., plasma-based) method of producing the ionically conductive composition. Further described is a method for using an additive manufacturing (AM) process to produce an object constructed of the ionically conductive composition by use of particles of the ionically conductive composition as a feed material in the AM process.

27 Claims, 10 Drawing Sheets

(51) Int. Cl.
| | |
|---|---|
| *H01M 10/44* | (2006.01) |
| *H01M 4/505* | (2010.01) |
| *H01M 4/525* | (2010.01) |
| *H01M 4/583* | (2010.01) |
| *H01M 10/26* | (2006.01) |
| *H01M 6/18* | (2006.01) |
| *C01B 33/32* | (2006.01) |
| *H01M 10/0525* | (2010.01) |
| *H01M 4/02* | (2006.01) |

(52) U.S. Cl.
CPC ........... *H01M 4/583* (2013.01); *H01M 6/187* (2013.01); *H01M 10/0525* (2013.01); *H01M 10/0562* (2013.01); *H01M 10/26* (2013.01); *H01M 10/44* (2013.01); *C01P 2004/32* (2013.01); *C01P 2006/40* (2013.01); *H01M 6/185* (2013.01); *H01M 2004/027* (2013.01); *H01M 2004/028* (2013.01); *H01M 2300/002* (2013.01)

(58) Field of Classification Search
CPC ............. H01M 6/185; H01M 10/0525; H01M 10/0562; H01M 10/26; H01M 10/44; H01M 2004/027; H01M 2004/028; H01M 2300/002; C01P 2004/32; C01P 2006/40
See application file for complete search history.

(56) References Cited

U.S. PATENT DOCUMENTS

| | | | | |
|---|---|---|---|---|
| 8,597,838 | B2 * | 12/2013 | Liang ................. | H01M 4/1397 429/188 |
| 8,871,391 | B2 * | 10/2014 | Liang ................. | H01M 4/5815 429/188 |
| 9,548,512 | B2 * | 1/2017 | Liang ................. | H01M 10/052 |
| 9,853,322 | B2 | 12/2017 | Kawaji et al. | |
| 10,224,565 | B2 * | 3/2019 | Nanda ................. | H01M 4/1395 |
| 2003/0175569 | A1 | 9/2003 | Inagaki et al. | |
| 2005/0260786 | A1 | 11/2005 | Yoshikawa et al. | |
| 2015/0188124 | A1 | 7/2015 | Ichikawa | |
| 2016/0190640 | A1 | 6/2016 | Visco et al. | |
| 2016/0233535 | A1 | 8/2016 | Leah et al. | |
| 2016/0351973 | A1 | 12/2016 | Albano et al. | |
| 2019/0173129 | A1 | 6/2019 | Gaben et al. | |
| 2019/0198918 | A1 | 6/2019 | Yamamoto et al. | |

OTHER PUBLICATIONS

International Search Report dated Dec. 2, 2020 issued in PCT/US2020/044382, 4 pages.

Mascaraque, N., et al., "An interpretation for the increase of ionic conductivity by nitrogen incorporation in LiPON oxynitride glasses", Solid State Ionics (2013), Received Sep. 17, 2012, Received in revised form Nov. 20, 2012, Accepted Dec. 29, 2012, Available onlin Jan. 24, 2013, pp. 73-79, 233.

Paraschiv, G.L., et al., "Mixed alkali silicophosphate oxynitride glasses: Structure-property relations", Journal of Non-Crystalline Solids (2017), Received Nov. 29, 2016, Received in revised form Jan. 17, 2017, Accepted Feb. 16, 2017, Available online Feb. 24, 2017, pp. 51-64, 462.

Paraschiv, G.L., et al., "Impact of nitridation of metaphosphate glasses on liquid fragility", Journal of Non-Crystalline Solids (2016), Received Dec. 18, 2015, Received in revised form Mar. 11, 2016, Accepted Mar. 16, 2016, Available online Apr. 2, 2016, pp. 22-28, 441.

Reidmeyer, M.R., et al., "Preparation of Phosphorus Oxynitride Glasses", Journal of Non Crystalline Solids (1986), Received Sep. 10, 1985, pp. 186-203, 85.

Wang, B., et al., "Ionic conductivities and structure of lithium phosphorus oxynitride glasses", Journal of Non-Crystalline Solids (1995), Received Aug. 18, 1994, revised manuscript received Nov. 7, 1994, pp. 297-306, 183.

Westover, A.S., et al., "Plasma Synthesis of Spherical Crystalline and Amorphous Electrolyte Nanopowders for Solid-State Batteries", ACS Applied Materials & Interfaces 2020, Received Nov. 21, 2019, Accepted Feb. 12, 2020, Published Feb. 12, 2020, pp. 11570-11578, 12.

* cited by examiner

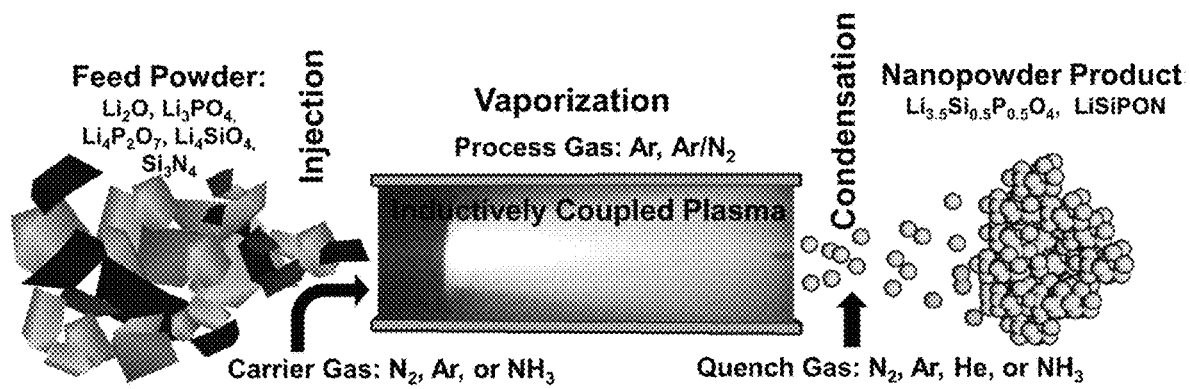
(1A)
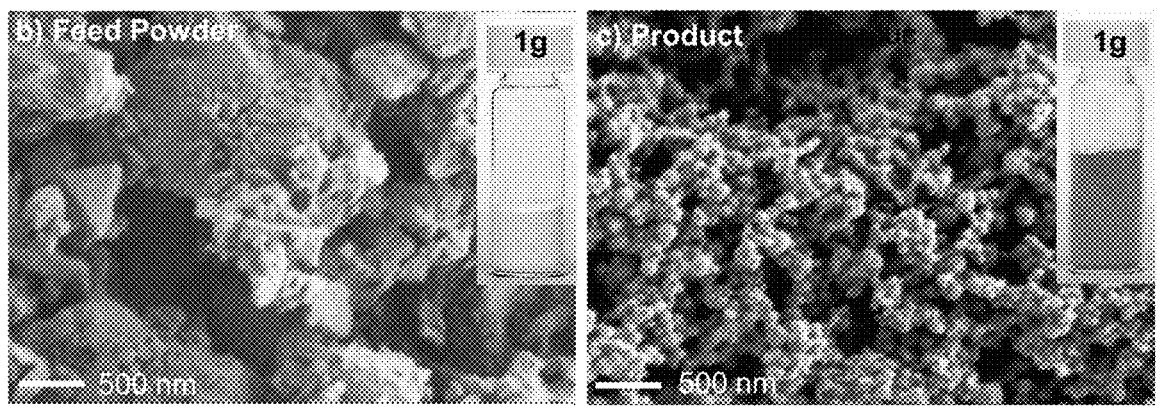
(1B)  (1C)
FIGS. 1A-1C (3C)

(3D)

(4B)

(4C)

(4D)

(4E)

IONICALLY CONDUCTIVE POWDERS AND FILMS, AND METHODS OF PREPARATION

CROSS REFERENCE TO RELATED APPLICATION

The present application claims benefit of U.S. Provisional Application No. 62/882,029, filed on Aug. 2, 2019, all of the contents of which are incorporated herein by reference.

GOVERNMENT SUPPORT

This invention was made with government support under Prime Contract No. DE-AC05-00OR22725 awarded by the U.S. Department of Energy. The government has certain rights in the invention.

FIELD OF THE INVENTION

The present invention relates generally to ionically conductive solid powders and films, as well as batteries in which such powders and films may be incorporated as solid electrolytes. The present invention is also directed to thermal-based methods for producing such ionically conductive powders and films.

BACKGROUND OF THE INVENTION

Ionically conductive solid materials are garnering substantial interest as solid electrolytes for a number of applications, including rechargeable batteries, memristors, and sensors. Solid-state batteries, in particular, rely on such solid ion conductors. When used with a metal anode, such as lithium or sodium, solid-state batteries have the promise of improved safety and energy density. Successful implementation of solid-state batteries will require a paradigm shift in battery manufacturing.

Solid-state ionic conductors, also known as electrolytes, range in composition with different ionically conductive species, such as Li, Na, K, Mg, Ag etc., generally in the form of oxides, sulfides, nitrides and various combinations thereof. The structure of inorganic solid electrolytes also varies from fully amorphous to glass-ceramic to fully crystalline. There are distinct advantages for each composition and structure. For example, in Li-based ionic conductors, crystalline electrolytes typically have higher ionic conductivities for both oxides and sulfides, while the glassy electrolytes in the LIPON family have superior resistance to Li filament penetration. For manufacturing, versatile control of compositions and structures is needed. Most processes for crystalline electrolytes rely on standard ceramic powder processing in a dry room. These processes typically require a significant amount of excess Li to achieve the correct compositions and structures. For the glassy LIPON family of electrolytes, conventional glass making processes can only produce compositions with a low Li content and ionic conductivity. To improve the ionic conductivity for use in a battery, the Li and N contents can be increased, but efforts in doing so, particularly while maintaining an amorphous structure, have remained elusive. Introducing Si into the glassy electrolyte may improve the ionic conductivity and make it easier to maintain an amorphous structure with a higher Li content. However, there remains a need for a versatile method of making ionic conductors with a range of stable amorphous, crystalline, and glass-ceramic structures and chemical compositions.

SUMMARY OF THE INVENTION

In one aspect, the present disclosure is directed to a solid ionically conductive material possessing a range of advantages over those of the conventional art. The ionically conductive material described herein can advantageously be formed into a film or membrane to form a solid electrolyte film or membrane. The ionically conductive material may alternatively be deposited onto a substrate for use as a cathode or the material may be integrated into a cathode (e.g., as a film or admixed with a binder) for a number of different types of batteries. The compositions described herein can also advantageously contain at least or a higher amount of alkali or alkaline earth metal than in the conventional art while possessing at least partial or complete amorphous (glassy) character. The compositions described herein can also advantageously contain at least or a higher amount of nitrogen than in the conventional art while possessing at least partial or complete amorphous character.

The ionically conductive composition described herein more specifically contains at least one element selected from the group consisting of alkali metal, alkaline earth metal, aluminum, zinc, copper, and silver in combination with at least two elements selected from the group consisting of oxygen, sulfur, silicon, phosphorus, nitrogen, boron, gallium, indium, tin, germanium, arsenic, antimony, bismuth, transition metals, and lanthanides. In more specific embodiments, the ionically conductive composition described herein contains at least one of alkali metal atoms and alkaline earth metal atoms in combination with at least two elements selected from the group consisting of oxygen, sulfur, silicon, phosphorus, nitrogen, boron, aluminum, gallium, indium, tin, germanium, arsenic, antimony, bismuth, transition metals, and lanthanide atoms. In some embodiments, the ionically conductive composition comprises ionically conductive particles having a size in a range of 10-300 nm or 10-250 nm or 10-200 nm. In other embodiments, the ionically conductive composition is a film or membrane, either monolithic or as deposited on a substrate, wherein the film or membrane may be formed of consolidated particles of the ionically conductive composition or the film or membrane may be continuous (non-particulate) and having any of the ionically conductive compositions described herein. In some embodiments, the ionically conductive particles have a spherical shape and may have a low degree of polydispersity (i.e., may be substantially monodisperse or uniform).

In some embodiments, the ionically conductive composition (i.e., particles or film) has a composition comprising alkali metal (e.g., lithium) and oxygen atoms in combination with at least one element selected from the group consisting of silicon, phosphorus, nitrogen, and transition metal atoms. In other embodiments, the ionically conductive composition has a composition comprising alkali metal (e.g., lithium), silicon, and oxygen atoms in combination with at least one element selected from the group consisting of phosphorus, nitrogen, and transition metal atoms. In other embodiments, the ionically conductive composition has a composition comprising alkali metal (e.g., lithium), silicon, phosphorus, and oxygen atoms in combination with at least one element selected from the group consisting of nitrogen and transition metal atoms. In other embodiments, the ionically conductive composition has a composition comprising alkali metal (e.g., lithium), silicon, phosphorus, oxygen, and nitrogen atoms. In some embodiments, any of the ionically conductive compositions described above contains conductive particles in consolidated form and shaped as a film. In some embodiments, any of the ionically conductive compositions (i.e., particles or film) described above is at least partially or completely amorphous. In some embodiments, any of the ionically conductive compositions (i.e., particles or continuous film) described above contains alkali metal atoms and tetrahedral oxyanion units, and the alkali metal atoms are included in an alkali metal to tetrahedral oxyanion molar ratio of at least 2. In yet other embodiments, any of the ionically conductive compositions (i.e., particles or continuous film) described above contains alkali metal atoms and tetrahedral oxyanion units, and the alkali metal atoms are included in an alkali metal to tetrahedral oxyanion molar ratio of at least 3.

In another aspect, the present disclosure is directed to a battery containing an anode, a cathode, and any one of the above described ionically conductive compositions as a solid electrolyte in contact with or as part of the anode and/or cathode. In some embodiments, the ionically conductive composition is in the form of solid particles, as described above, typically consolidated as a film. In other embodiments, the ionically conductive composition is in the form of a continuous (non-particulate) film. The battery may be, for example, a metal anode battery (e.g., lithium, sodium, magnesium, calcium, aluminum, copper, zinc, or silver) or metal-ion battery (e.g., lithium-ion, sodium-ion, magnesium-ion, calcium-ion, aluminum-ion, copper-ion, zinc-ion, or silver-ion).

In another aspect, the present disclosure is directed to methods for producing particles or films of any of the ionically conductive compositions described above. For the production of particles, the method includes subjecting a precursor material (e.g., a single material or mixture of materials) containing all elements desired to be in the resulting ionically conductive composition, as described above, to a thermal process in which the precursor material is at least partially vaporized to undergo atomic rearrangement and subsequently cooled to result in production of the ionically conductive particles. For the production of continuous films, the method includes subjecting a precursor material (e.g., a single material or mixture of materials) containing all elements desired to be in the resulting ionically conductive composition, as described above, to a thermal process in which the precursor material is at least partially vaporized to undergo atomic rearrangement and subsequently cooled (quenched, i.e., condensed) on a substrate to form the ionically conductive continuous film on the substrate, wherein the substrate may be a battery cathode. The ionically conductive continuous film may, in some embodiments, be removed from the substrate to form a monolithic film or membrane. In some embodiments, the thermal process is a plasma process, or more specifically, an inductive coupled plasma (ICP) process.

Inductive plasma processing, in particular, has herein been used to produce ionically conductive glass powders. Some exemplary types of glasses or crystalline materials that can be produced using inductive plasma processing include: lithium silicate, lithium phosphate, lithium phosphosilicate, lithium phosphorous oxynitride, and lithium phosphorous silicon oxynitride. However, this processing technique is capable of producing other compositions with potentially higher ionic conductivity, including a range of compositions containing alkali metals, phosphorous, silicon, boron, sulfur, aluminum, germanium, selenium, antimony, arsenic, oxygen, nitrogen, zirconium, lanthanum, titanium, silver, copper, tungsten, molybdenum, and other possible elements. The precursors are typically either oxides or nitrides, but this does not preclude the use of other precursor materials (e.g., phosphide, borides, aluminides, or lanthanides). For oxynitride glass powders, a nitrogen-containing gas and/or a silicon nitride precursor has herein been employed to incorporate nitrogen in the final product. Notably, for purposes of the present invention, other nitride precursors or an ammonia carrier gas (e.g., aluminum nitride or ammonia gas) should also function as useful nitrogen sources. A nitrogen plasma may also be used. Generally, four different gases are used in the process, i.e., a quench gas, carrier gas, sheath gas, and the plasma gas. Nitrogen may be incorporated in any of these, although less typically in the sheath gas. The nitrogen-containing gas may be, for example, nitrogen gas or ammonia gas. In some embodiments, nitrogen gas or ammonia is included in the carrier gas, and may optionally be included in the quench gas and/or plasma gas. The ionic conductivities of powders produced by the inventive process have been measured and compare well with commercial ionically-conductive powders. Moreover, further compositional adjustments (e.g., increased lithium content, increased nitrogen content, or atomic doping) should further increase the ionic conductivity.

In particular embodiments, inductive plasma processing is used as a high-temperature, rapid-quench technique that can be used to make nanopowders of the ionically conductive material. In this technique, the precursors are injected into superheated plasma, vaporized, and condensed into high-purity spherical particles as they emerge from the plasma. Development of such high-quality powders is also a key requirement for the successful implementation of advanced manufacturing of solid-state batteries, such as additive manufacturing, spray coating, laser sintering, microwave sintering, and screen printing. More particularly, in the plasma process, precursor powders, liquids, and/or gases are passed through a radio-frequency plasma torch, where they are vaporized into atoms or molecular fragments as they briefly experience a thermal plasma of about 10,000K. Then, if rapid quenching is desired, such as to form an amorphous composition, the vaporized material is passed into a rapid quench reactor, where a very high gas flow rate (e.g., up to 250 L/min) is used to quench the vaporized material (e.g., at $10^4$-$10^{5\circ}$ C./s) into a nanoparticulate product.

In some embodiments, the invention employs inductive plasma processing to produce oxynitride (and oxide) glass electrolyte materials. This high-temperature, rapid-quench processing technique can be used to produce oxynitride glasses with high lithium content and substantial nitrogen content, which has not yet been achieved by methods of the conventional art. Moreover, the present invention may achieve high-lithium content oxynitride glass powders with exceptionally high ionic conductivity, e.g., $10^{-5}$ S/cm or higher at room temperature. The present invention may use an inductively coupled plasma torch or other plasma means to synthesize, for example, spherical nanopowders of crystalline LISICON compositions, such as $Li_{4-x}Si_{1-x}P_xO_4$ compositions (e.g., $Li_{3.5}Si_{0.5}P_{0.5}O_4$ or $Li_{3.5}Si_{0.5}P_{0.5}S_4$) or $Li_{2+2x}Zn_{1-x}GeO_4$ compositions; or 100% amorphous LISIPON compositions (e.g., $Li_{2.7}Si_{0.7}P_{0.3}O_{3.17}N_{0.22}$) These powders can be synthesized from either a homogenous precursor, or a mixed precursor for one-step synthesis and spheroidization without the significant Li loss that hinders other conventional synthesis techniques. In particular embodiments, the nanopowders produced are spherical and have a size distribution ranging from 10-300 nm, or more particularly, 10-250 nm, 10-200 nm, 40-300 nm, 40-250 nm, or 40-200 nm. A particularly advantageous property of these ionically conductive particles is their ability to be sintered or otherwise pressed into a dense compact film at 800° C. or lower temperature, which is well below the traditional sintering temperature of 1000-1100° C. for these materials. The depressed sintering temperature advantageously results in a lower membrane processing cost. Pressing and/or sintering of these powders may advantageously result in membranes with an ionic conductivity between 0.5-5 μS/cm. In some embodiments, a nanopowder version of a LiSICON composition is sintered into a dense pellet at a much lower temperature than a conventional micron-sized LiSICON powder. The process described above can advantageously be used to produce a wide range of other ionically conductive compositions, some of which possess particularly high ionic conductivities, including, for example, Li—La—Zr—O (LLZO) and sulfide-based LISICON materials, such as $Li_{3.5}Si_{0.5}P_{0.5}S_4$.

BRIEF DESCRIPTION OF THE DRAWINGS

FIGS. 1A-1C. FIG. 1A is a schematic of the inductively coupled plasma synthesis process in which a homogeneous or mixed precursor is injected into a plasma torch, vaporized, and then condensed into a spherical nanopowder product. FIG. 1B is an SEM image of the precursor with an inset photograph of 1 g of the precursor material in a vial.

FIG. 1C is an SEM image of the nanopowder product with an inset photograph of 1 g of the product in an identical vial to that in FIG. 1B.

FIG. 2A is an x-ray diffraction (XRD) pattern of the precursor and plasma-processed $Li_3PO_4$. FIG. 2B is an XRD pattern of the precursor and plasma-processed $Li_4SiO_4$.

FIG. 3A is an XRD pattern of the precursor ("pre") and plasma-processed ("post") $Li_{3.5}Si_{0.5}P_{0.5}O_4$ from the homogeneous $Li_{3.5}Si_{0.5}P_{0.5}O_4$ precursor. FIG. 3B is an XRD pattern of the precursor and plasma-processed $Li_{3.5}Si_{0.5}P_{0.5}O_4$ produced from mixed $Li_3PO_4$ and $Li_4SiO_4$ precursors. FIG. 3C is a SEM image of the plasma-processed $Li_{3.5}Si_{0.5}P_{0.5}O_4$ from a homogenous precursor, with inset showing a photograph of the powder in a vial. FIG. 3D is a graph showing a particle size analysis for the $Li_{3.5}Si_{0.5}P_{0.5}O_4$ powder shown in the SEM image in FIG. 3C.

FIG. 4A is a TEM image (two left-most panels) of plasma-produced $Li_{2.7}Si_{0.7}P_{0.3}O_{3.17}N_{0.22}$ material along with EELS analysis (five right-most panels) showing a uniform distribution of Li, Si, P, O, and N (from left to right, respectively). FIG. 4B shows an XRD pattern of the precursor and plasma-produced $Li_{2.7}Si_{0.7}P_{0.3}O_{3.17}N_{0.22}$ material from the mixed precursor $Li_2O$, $Si_3N_4$, $Li_4P_2O_7$, and $Li_4SiO_4$. FIG. 4C is an electron diffraction pattern for the plasma-produced $Li_{2.7}Si_{0.7}P_{0.3}O_{3.17}N_{0.22}$ material. FIG. 4D shows a particle size distribution for the plasma-produced $Li_{2.7}Si_{0.7}P_{0.3}O_{3.17}N_{0.22}$ material. FIG. 4E is a graph of the ionic conductivity of cold-pressed plasma-produced $Li_{2.7}Si_{0.7}P_{0.3}O_{3.17}N_{0.22}$ material.

FIG. 7A is a SEM image of the nano-sized $Li_{3.5}Si_{0.5}P_{0.5}O_4$ particles sintered at 725° C. FIG. 7B is a SEM image of the nano-sized $Li_{3.5}Si_{0.5}P_{0.5}O_4$ particles sintered at 800° C. FIG. 7C is a SEM image of conventionally prepared micron-sized $Li_{3.5}Si_{0.5}P_{0.5}O_4$ particles sintered at 725° C. FIG. 7D is a SEM image of conventionally prepared micron-sized $Li_{3.5}Si_{0.5}P_{0.5}O_4$ particles sintered at 800° C.

DETAILED DESCRIPTION OF THE INVENTION

Figures 2A, 2B:
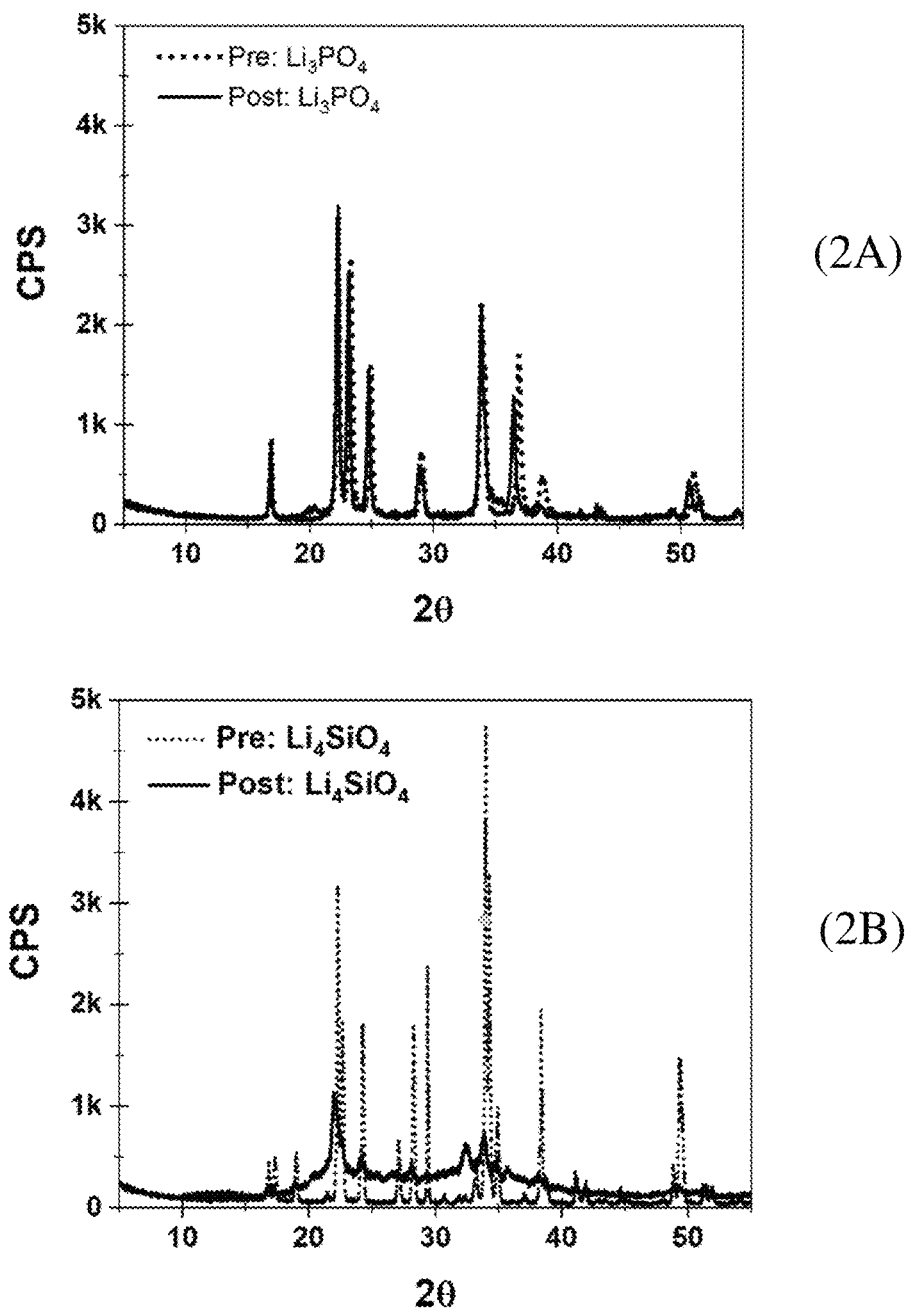
FIGS. 2A-2B.

In one aspect, the present disclosure is directed to ionically conductive compositions. The term "ionically conductive," as used herein, generally refers to an ionic conductivity of at least or above $1 \times 10^{-7}$ S/cm, typically at or about room temperature (typically 20° C. or 25° C.). In different embodiments, the ionically conductive composition has an ionic conductivity of at least or above, for example, $1 \times 10^{-7}$ S/cm, $5 \times 10^{-7}$ S/cm, $1 \times 10^{-6}$ S/cm, $5 \times 10^{-6}$ S/cm, $1 \times 10^{-5}$ S/cm, $5 \times 10^{-5}$ S/cm, $1 \times 10^{-4}$ S/cm, $5 \times 10^{-4}$ S/cm, or $1 \times 10^{-6}$ S/cm, or an ionic conductivity within a range bounded by any two of the foregoing values. The foregoing values are typically in reference to consolidated films of powders of the ionically conductive compositions, although the particles themselves may have the same or even higher ionic conductivities (e.g., above $1 \times 10^{-3}$ S/cm).

In some embodiments, the ionically conductive composition has a particulate morphology. The particles may have any of a variety of shapes, including spherical, rod, wire (fiber), or platelet. In the case of ionically conductive particles, the particles generally have a particle size of at least 10 nm and up to 300 nm. In different embodiments, the particle size is, for example, 10 nm, 20 nm, 30 nm, 40 nm, 50 nm, 60 nm, 70 nm, 80 nm, 90 nm, 100 nm, 120 nm, 150 nm, 180 nm, 200 nm, 220 nm, 250 nm, 280 nm, or 300 nm, or a particle size within a range bounded by any two of the foregoing values, e.g., 10-300 nm, 10-250 nm, 10-200 nm, 10-150 nm, 10-100 nm, 20-300 nm, 20-250 nm, 20-200 nm, 20-150 nm, 20-100 nm, 30-300 nm, 30-250 nm, 30-200 nm, 30-150 nm, 30-100 nm, 40-300 nm, 40-250 nm, 40-200 nm, 40-150 nm, 40-100 nm, 50-300 nm, 50-250 nm, 50-200 nm, 50-150 nm, or 50-100 nm. The particles may also be polydisperse or substantially monodisperse (uniform) in size. In the case of the particles being substantially uniform in size, the particles may have a median size corresponding to any of the exemplary sizes provided above, with all particles being exclusively within a size of no more than ±50 nm, ±20 nm, ±15 nm, ±10 nm, ±5 nm, or ±2 nm from the median size, permitted that the particle size does not extend outside the range of 10-300 nm. Thus, if a mean particle size of 20 nm is selected along with variation of ±20 nm, the particle size should be exclusively within the range of 10-40 nm (not 0-40 nm).

In other embodiments, the ionically conductive composition has a continuous (non-particulate) film or membrane morphology. The term "continuous" also indicates a smooth planar surface, i.e., without protruded or recessed features. In the case of a continuous film, the film generally has a thickness of at least 5 nm and up to 500 microns (500 μm). In different embodiments, the film thickness is, for example, 5 nm, 10 nm, 20 nm, 50 nm, 100 nm, 200 nm, 500 nm, 1 μm, 2 μm, 5 μm, 10 μm, 20 μm, 50 μm, 100 μm, 200 μm, 300 μm, 400 μm, or 500 μm, or a thickness within a range bounded by any two of the foregoing values, e.g., 5 nm-500 μm, 5 nm-200 μm, 5 nm-100 μm, 5 nm-50 μm, 5 nm-5 μm, 5 nm-1 μm, 5-500 nm, 5-200 nm, 5-100 nm, or 5-50 nm. The ionically conductive composition may alternatively be shaped as a film but formed of consolidated particles of the ionically conductive composition. The foregoing film is thus not in continuous form. The term "consolidated," as used herein, indicates that the particles are connected and form a single solid mass, with an extended particulate structure present. The consolidated particles may be considered to be fused or sintered. The consolidated film may be porous or non-porous.

The ionically conductive particles or film may be partially or completely crystalline or amorphous (glassy). In some embodiments, the particles or film may be completely (i.e., 100%) crystalline or amorphous. In other embodiments, the particles or film may be at least partially amorphous, e.g., precisely or at least 10%, 20%, 30%, 40%, 50%, 60%, 70%, 80%, or 90% amorphous, or a level of amorphous within a range bounded by any two of the foregoing values or between any of the foregoing values and 100%.

The particles and films described above have an ionically conductive composition. The ionically conductive composition contains at least one element selected from alkali metal, alkaline earth metal, aluminum, zinc, copper, and silver in combination with at least two elements selected from oxygen, sulfur, silicon, phosphorus, nitrogen, boron, gallium, indium, tin, germanium, arsenic, antimony, bismuth, transition metals, and lanthanides. In some embodiments, the ionically conductive composition contains at least one of alkali metal atoms and alkaline earth metal atoms in combination with at least two elements selected from the group consisting of oxygen (O), sulfur (S), silicon (Si), phosphorus (P), nitrogen (N), boron (B), aluminum (Al), gallium (Ga), indium (In), tin (Sn), germanium (Ge), arsenic (As), antimony (Sb), bismuth (Bi), transition metals, and lanthanide atoms. The alkali metal can be any of the elements of Group I of the Periodic Table, e.g., lithium (Li), sodium (Na), or potassium (K), or a combination thereof. The alkaline earth metal can be any of the elements of Group II of the Periodic Table, e.g., magnesium (Mg), calcium (Ca), or strontium (Sr). The transition metal can be any of the elements of Groups 3-12, typically of the first row, e.g., scandium, titanium, vanadium, chromium, manganese, iron, cobalt, nickel, copper, or zinc, although the transition metal may be a second or third row transition metal within the same group as any of the foregoing first row transition metals. The lanthanide element can be any of the elements having an atomic number of 57-71, e.g., lanthanum, cerium, neodymium, samarium, europium, gadolinium, or dysprosium. The ionically conductive composition may or may not also include (or may exclude) one or more additional elements not recited above (e.g., Se, Te, Pb, Tl, F, Cl, Br, I, or C). Notably, in some embodiments, any one or more classes or specific types of elements recited above may be excluded from the ionically conductive composition. Alternatively, the ionically conductive composition may exclusively contain any three, four, five, six, seven, or eight elements selected from the above recited elements, with any number of other elements excluded. In some embodiments, at least one of B, Al, Ga, Zn, Sn, or La is included in (or, in some embodiments, excluded from) any the compositions described above or as further described below.

As indicated above, the ionically conductive composition contains precisely or at least three elements. However, in some embodiments, the ionically conductive composition contains precisely or at least four, five, six, seven, or eight elements, e.g., at least one of alkali metal atoms and alkaline earth metal atoms (or Al, Zn, Cu, or Ag) in combination with precisely or at least three, four, five, six, or seven elements selected from the group consisting of O, S, Si, P, N, B, Al, Ga, In, Sn, Ge, As, Sb, Bi, transition metals, and lanthanide atoms. In some embodiments, the ionically conductive composition contains alkali metal atoms and not alkaline earth metal atoms. In other embodiments, the ionically conductive composition contains alkaline earth metal atoms and not alkali metal atoms. In other embodiments, the ionically conductive composition contains both alkali and alkaline earth metal atoms. In some embodiments, the ionically conductive composition contains oxygen atoms and may or may not contain nitrogen, phosphorus, or sulfur atoms. In other embodiments, the ionically conductive composition contains nitrogen atoms and may or may not contain oxygen, phosphorus, or sulfur atoms. In other embodiments, the ionically conductive composition contains sulfur atoms and may or may not contain oxygen, phosphorus, or nitrogen atoms.

In a first particular embodiment, the ionically conductive composition (i.e., particles or film) contains at least one alkali metal atom (e.g., lithium or sodium) and oxygen atoms (or sulfur atoms) in combination with precisely or at least any one element recited earlier above, e.g., from among S, Si, P, N, B, Al, Ga, In, Sn, Ge, As, Sb, Bi, transition metals, and lanthanide atoms. In more particular embodiments, the composition contains at least one alkali metal atom (e.g., lithium or sodium) and oxygen atoms (or sulfur atoms) in combination with precisely or at least one, two, or more elements selected from the group consisting of silicon, phosphorus, nitrogen, transition metal (TM), and lanthanide (L) atoms. In some embodiments, one or more additional elements recited earlier above may be further included. Alternatively, one or more additional elements recited earlier above may be excluded. In different exemplary embodiments, the foregoing composition contains precisely or at least three elements, e.g., precisely or at least Li, O, and Si; or Li, O, and P; or Li, O, and N; or Li, O, and TM; or Li, O, and L; or Na, O, and Si; or Na, O, and P; or Na, O, and N; or Na, O, and TM; or Na, O, and L. In some embodiments, nitrogen is also included, wherein the composition may include, e.g., Li, O, Si, and N; or Li, O, P, and N; or Li, O, TM, and N; or Li, O, L, and N; or Na, O, Si, and N; or Na, O, P, and N; or Na, O, TM, and N; or Na, O, L, and N. Any of the foregoing compositions may or may not also include (or may exclude) one or more alkaline earth metal atoms, e.g., Mg, Ca, or Sr. Any of the foregoing compositions may or may not also include (or may exclude) B, Al, Ga, or In.

In a second particular embodiment, the ionically conductive composition (i.e., particles or film) contains at least one alkali metal atom (e.g., lithium or sodium), silicon atoms, and oxygen atoms (or sulfur atoms) in combination with precisely or at least any one element recited earlier above, e.g., from among S, P, N, B, Al, Ga, In, Sn, Ge, As, Sb, Bi, transition metals, and lanthanide atoms. In more particular embodiments, the composition contains at least one alkali metal atom (e.g., lithium or sodium), silicon atoms, and oxygen atoms (or sulfur atoms) in combination with precisely or at least one, two, or more elements selected from the group consisting of phosphorus, nitrogen, transition metal (TM), and lanthanide (L) atoms. In some embodiments, one or more additional elements recited earlier above may be further included. Alternatively, one or more additional elements recited earlier above may be excluded. In different exemplary embodiments, the foregoing composition contains precisely or at least four elements, e.g., precisely or at least Li, O, Si, and P; or Li, O, Si, and N; or Li, O, Si, and TM; or Li, O, Si, and L; or Na, O, Si, and P; or Na, O, Si, and N; or Na, O, Si, and TM; or Na, O, Si, and L. In some embodiments, nitrogen is also included, wherein the composition may include, e.g., Li, O, Si, P, and N; or Li, O, Si, TM, and N; or Li, O, Si, L, and N; or Na, O, Si, P, and N; or Na, O, Si, TM, and N; or Na, O, Si, L, and N. Any of the foregoing compositions may or may not also include (or may exclude) one or more alkaline earth metal atoms, e.g., Mg, Ca, or Sr. Any of the foregoing compositions may or may not also include (or may exclude) B, Al, Ga, or In.

In a third particular embodiment, the ionically conductive composition (i.e., particles or film) contains at least one alkali metal atom (e.g., lithium or sodium), silicon atoms, phosphorus atoms, and oxygen atoms (or sulfur atoms) in combination with precisely or at least any one element recited earlier above, e.g., from among S, N, B, Al, Ga, In, Sn, Ge, As, Sb, Bi, transition metals, and lanthanide atoms. In more particular embodiments, the composition contains at least one alkali metal atom (e.g., lithium or sodium), silicon atoms, phosphorus atoms, and oxygen atoms (or sulfur atoms) in combination with precisely or at least one, two, or more elements selected from the group consisting of nitrogen, transition metal (TM), and lanthanide (L) atoms. In some embodiments, one or more additional elements recited earlier above may be further included. Alternatively, one or more additional elements recited earlier above may be excluded. In different exemplary embodiments, the foregoing composition contains precisely or at least five elements, e.g., precisely or at least Li, O, Si, P, and N; or Li, O, Si, P, and TM; or Li, O, Si, P, and L; or Na, O, Si, P, and N; or Na, O, Si, P, and TM; or Na, O, Si, P, and L. In some embodiments, nitrogen is also included, wherein the composition may include, e.g., Li, O, Si, P, TM, and N; or Li, O, Si, P, L, and N; or Na, O, Si, P, TM, and N; or Na, O, Si, P, L, and N. Any of the foregoing compositions may or may not also include (or may exclude) one or more alkaline earth metal atoms, e.g., Mg, Ca, or Sr. Any of the foregoing compositions may or may not also include (or may exclude) B, Al, Ga, or In. In some embodiments, the ionically conductive particles have a composition containing precisely or at least an alkali metal atom (e.g., lithium), silicon, phosphorus, oxygen, and nitrogen atoms. In some embodiments, one or more additional elements recited earlier above may be further included. Alternatively, one or more additional elements recited earlier above may be excluded. Any of the foregoing compositions may or may not also include (or may exclude) one or more alkaline earth metal atoms, e.g., Mg, Ca, or Sr.

In a fourth particular embodiment, the ionically conductive composition (i.e., particles or film) contains at least one alkaline earth metal atom (e.g., Mg, Ca, or Sr) and oxygen atoms (or sulfur atoms) in combination with precisely or at least any one element recited earlier above, e.g., from among S, Si, P, N, B, Al, Ga, In, Sn, Ge, As, Sb, Bi, transition metals, and lanthanide atoms. In more particular embodiments, the composition contains at least one alkaline earth metal atom (e.g., Mg, Ca, or Sr) and oxygen atoms (or sulfur atoms) in combination with precisely or at least one, two, or more elements selected from the group consisting of silicon, phosphorus, nitrogen, transition metal (TM), and lanthanide (L) atoms. In some embodiments, one or more additional elements recited earlier above may be further included. Alternatively, one or more additional elements recited earlier above may be excluded. In different exemplary embodiments, the foregoing composition contains precisely or at least three elements, e.g., precisely or at least Mg, O, and Si; or Mg, O, and P; or Mg, O, and N; or Mg, O, and TM; or Mg, O, and L; or Ca, O, and Si; or Ca, O, and P; or Ca, O, and N; or Ca, O, and TM; or Ca, O, and L. In some embodiments, nitrogen is also included, wherein the composition may include, e.g., Mg, O, Si, and N; or Mg, O, P, and N; or Mg, O, TM, and N; or Mg, O, L, and N; or Ca, O, Si, and N; or Ca, O, P, and N; or Ca, O, TM, and N; or Ca, O, L, and N. Any of the foregoing compositions may or may not also include (or may exclude) one or more alkali metal atoms, e.g., Li, Na, or K. Any of the foregoing compositions may or may not also include (or may exclude) B, Al, Ga, or In.

In a fifth particular embodiment, the ionically conductive composition (i.e., particles or film) contains at least one alkaline earth metal atom (e.g., Mg, Ca, or Sr), silicon atoms, and oxygen atoms (or sulfur atoms) in combination with precisely or at least any one element recited earlier above, e.g., from among S, P, N, B, Al, Ga, In, Sn, Ge, As, Sb, Bi, transition metals, and lanthanide atoms. In more particular embodiments, the composition contains at least one alkaline earth metal atom (e.g., Mg, Ca, or Sr), silicon atoms, and oxygen atoms (or sulfur atoms) in combination with precisely or at least one, two, or more elements selected from the group consisting of phosphorus, nitrogen, transition metal (TM), and lanthanide (L) atoms. In some embodiments, one or more additional elements recited earlier above may be further included. Alternatively, one or more additional elements recited earlier above may be excluded. In different exemplary embodiments, the foregoing composition contains precisely or at least four elements, e.g., precisely or at least Mg, O, Si, and P; or Mg, O, Si, and N; or Mg, O, Si, and TM; or Mg, O, Si, and L; or Ca, O, Si, and P; or Ca, O, Si, and N; or Ca, O, Si, and TM; or Ca, O, Si, and L. In some embodiments, nitrogen is also included, wherein the composition may include, e.g., Mg, O, Si, P, and N; or Mg, O, Si, TM, and N; or Mg, O, Si, L, and N; or Ca, O, Si, P, and N; or Ca, O, Si, TM, and N; or Ca, O, Si, L, and N. Any of the foregoing compositions may or may not also include (or may exclude) one or more alkali metal atoms, e.g., Li, Na, or K. Any of the foregoing compositions may or may not also include (or may exclude) B, Al, Ga, or In.

In a sixth particular embodiment, the ionically conductive composition (i.e., particles or film) contains at least one alkaline earth metal atom (e.g., Mg, Ca, or Sr), silicon atoms, phosphorus atoms, and oxygen atoms (or sulfur atoms) in combination with precisely or at least any one element recited earlier above, e.g., from among S, N, B, Al, Ga, In, Sn, Ge, As, Sb, Bi, transition metals, and lanthanide atoms. In more particular embodiments, the composition contains at least one alkaline earth metal atom (e.g., Mg, Ca, or Sr), silicon atoms, phosphorus atoms, and oxygen atoms (or sulfur atoms) in combination with precisely or at least one, two, or more elements selected from the group consisting of nitrogen, transition metal (TM), and lanthanide (L) atoms. In some embodiments, one or more additional elements recited earlier above may be further included. Alternatively, one or more additional elements recited earlier above may be excluded. In different exemplary embodiments, the foregoing composition contains precisely or at least five elements, e.g., precisely or at least Mg, O, Si, P, and N; or Mg, O, Si, P, and TM; or Mg, O, Si, P, and L; or Ca, O, Si, P, and N; or Ca, O, Si, P, and TM; or Ca, O, Si, P, and L. In some embodiments, nitrogen is also included, wherein the composition may include, e.g., Mg, O, Si, P, TM, and N; or Mg, O, Si, P, L, and N; or Ca, O, Si, P, TM, and N; or Ca, O, Si, P, L, and N. In some embodiments, the ionically conductive particles have a composition containing precisely or at least an alkaline earth metal atom (e.g., Mg, Ca, or Sr), silicon, phosphorus, oxygen, and nitrogen atoms. In some embodiments, one or more additional elements recited earlier above may be further included. Alternatively, one or more additional elements recited earlier above may be excluded. Any of the foregoing compositions may or may not also include (or may exclude) one or more alkali metal atoms, e.g., Li, Na, or K. Any of the foregoing compositions may or may not also include (or may exclude) B, Al, Ga, or In.

In other embodiments, the ionically conductive composition (i.e., particles or film) contains at least one element selected from Al, Zn, Cu, and Ag in combination with oxygen atoms (or sulfur atoms) in further combination with precisely or at least any one element recited earlier above, e.g., from among S, Si, P, N, B, Al, Ga, In, Sn, Ge, As, Sb, Bi, transition metals, and lanthanide atoms. In more particular embodiments, the composition contains at least one element selected from Al, Zn, Cu, and Ag in combination with oxygen atoms (or sulfur atoms) in further combination with precisely or at least one, two, or more elements selected from the group consisting of silicon, phosphorus, nitrogen, transition metal (TM), and lanthanide (L) atoms. In some embodiments, one or more additional elements recited earlier above may be further included. Alternatively, one or more additional elements recited earlier above may be excluded.

The ionically conductive compositions described above often include tetrahedral oxyanion ($MO_4^{n-}$) or sulfylanion ($MS_4^{n-}$) units, wherein M represents any suitable central element, typically a main group element (Groups 13-17) or transition metal element. Some examples of such anions include $SO_4^{2-}$, $SiO_4^{4-}$, $PO_4^{3-}$, $PS_4^{3-}$, $ClO_4^{-}$, $AsO_4^{3-}$, $CrO_4^{2-}$, $MnO_4^{-}$, and the thiosilicates ($SiS_{(2+n)}^{2-}$, such as $SiS_4^{4-}$, $SiO_2S_2^{4-}$, and $Si_2OS_6^{6-}$). In some embodiments, the ionically conductive composition (i.e., particles or a continuous film) contains at least one or more alkali metal atoms (e.g., Li and/or Na), and the alkali metal atoms are included in an alkali metal to tetrahedral oxyanion or sulfylanion molar ratio of at least or above 2, 2.5, 3, 3.5, or 4.

In another aspect, the present disclosure is directed to batteries in which any of the above described ionically conductive compositions is incorporated as a solid electrolyte. The battery contains at least an anode, a cathode, and the solid electrolyte in contact with or as part of the anode and/or cathode. In some embodiments, the solid electrolyte is incorporated in the battery in the form of particles, typically as a film or membrane containing particles, as described above. In other embodiments, the solid electrolyte is incorporated in the battery in the form of a continuous film, as described above. In the battery, the particles or film of solid electrolyte can have any of the compositions, particle sizes, particle shapes, film morphologies, or film thicknesses, as described above, and combined selections thereof, as desired. In some embodiments, the battery is a metal anode (plate) battery, such as a lithium metal battery, in which the anode contains a film of lithium metal. In other embodiments, the battery is a metal ion battery, in which the anode contains metal ions stored in a base material (e.g., lithium or sodium ions intercalated in graphite). Whether the battery contains a metal anode or metal-ion anode, the battery may be a single-use (primary) or rechargeable (secondary) battery.

In a particular embodiment, the battery is a lithium-based single use or rechargeable battery. Any of the lithium-containing compositions described above can be incorporated as a solid electrolyte in contact with the anode (negative electrode) and cathode (positive electrode) of the lithium metal or lithium-ion battery. Alternatively, any of the lithium-containing compositions described above can be incorporated into a cathode of the lithium metal or lithium-ion battery (typically admixed with a binder material), and the anode and cathode in contact with any of the above-described inventive solid electrolytes or any of the liquid (e.g., polar solvent or aqueous) or solid electrolytes known in the art. The lithium metal battery may contain any of the components typically found in a lithium metal battery, such as described in, for example, X. Zhang et al., *Chem. Soc. Rev.*, 49, 3040-3071, 2020; P. Shi et al., *Adv. Mater. Technol.*, 5(1), 1900806 (1-15), January 2020; and X.-B. Cheng et al., *Chem. Rev.*, 117, 15, 10403-10473 (2017), the contents of which are incorporated herein by reference. In some embodiments, the lithium metal battery contains molybdenum disulfide in the cathode. The lithium-ion battery may contain any of the components typically found in a lithium-ion battery, including positive (cathode) and negative (anode) electrodes, current collecting plates, a battery shell, such as described in, for example, U.S. Pat. Nos. 8,252,438, 7,205,073, and 7,425,388, the contents of which are incorporated herein by reference in their entirety.

In embodiments where the inventive solid electrolyte is in contact with an anode and cathode of the lithium-based battery but not incorporated into the cathode, the positive (cathode) electrode can have any of the compositions well known in the art, for example, a lithium metal oxide, wherein the metal is typically a transition metal, such as Co, Fe, Ni, or Mn, or combination thereof, or manganese dioxide ($MnO_2$), iron disulfide ($FeS_2$), or copper oxide (CuO). In some embodiments, the cathode has a composition containing lithium, nickel, and oxide. In further embodiments, the cathode has a composition containing lithium, nickel, manganese, and oxide. Some examples of cathode materials include $LiCoO_2$, $LiMn_2O_4$, $LiNiCoO_2$, $LiMnO_2$, and $LiFePO_4$. Some cathode materials are particularly suitable for 5.0V lithium-ion batteries, e.g., $LiNi_xMn_{2-x}O_4$ compositions, such as $LiNi_{0.5}Mn_{1.5}O_4$, wherein x is a number greater than 0 and less than 2. In some embodiments, one or more additional elements may substitute a portion of the Ni or Mn, as in $LiNi_xCo_{1-x}PO_4$, and $LiCu_xMn_{2-x}O_4$, materials (Cresce, A. V., et al., *Journal of the Electrochemical Society*, 2011, 158, A337-A342). In further specific embodiments, the cathode has a composition containing lithium, nickel, manganese, cobalt, and oxide, such as $LiNi_{w-y-z}Mn_yCo_zO_2$ composition (wherein w+y+z=1), or more specifically, $LiNi_{0.8}Mn_{0.1}Co_{0.1}O_2$. The cathode may alternatively have a layered-spinel integrated $Li[Ni_{1/3}Mn_{2/3}]O_2$ composition, as described in, for example, Nayak et al., *Chem. Mater.*, 2015, 27 (7), pp. 2600-2611. To improve conductivity at the cathode, conductive carbon material (e.g., carbon black, carbon fiber, or graphite) is typically admixed with the positive electrode material.

In the event of the battery being an alkali-ion or other ion-type battery, the negative (anode) electrode of the battery may be a carbon-based composition in which alkali or other ions can be stored (e.g., intercalated or embedded), such as elemental carbon, or more particularly graphite (e.g., natural or artificial graphite), petroleum coke, carbon fiber (e.g., mesocarbon fibers), or carbon (e.g., mesocarbon) microbeads. The anode may be at least 70 80, 90, or 95 wt % elemental carbon. The negative electrode may alternatively be a metal oxide, such as tin dioxide ($SnO_2$) or titanium dioxide ($TiO_2$), or a composite of carbon and a metal oxide.

The positive and negative electrode compositions are typically admixed with an adhesive (e.g., PVDF, PTFE, and co-polymers thereof) in order to be properly molded as electrodes. Typically, positive and negative current collecting substrates (e.g., Cu or Al foil) are also included. The assembly and manufacture of lithium-ion batteries are well known in the art. In some embodiments, the positive electrode may contain one of the solid electrolyte compositions described above.

In another particular embodiment, the battery is a sodium metal or sodium-ion battery in which any of the solid electrolyte compositions described above can be incorporated, either in contact with or as part of the anode and/or cathode. Any of the sodium-containing compositions described above can be incorporated as a solid electrolyte in contact with the anode (negative electrode) and cathode (positive electrode) of the sodium-based battery. Alternatively, any of the sodium-containing compositions described above can be incorporated into a cathode of the sodium-based battery (typically admixed with a binder material), and the anode and cathode in contact with any of the above-described inventive solid electrolytes or any of the liquid or solid electrolytes known in the art. Sodium metal batteries are well known in the art, such as described in, for example, H. Sun et al., *Nature Communications*, 10, 3302, 2019, the contents of which are herein incorporated by reference. Sodium-ion batteries are also well known in the art, such as described in, for example, U.S. Application Publication No. 2012/0021273, and B. L. Ellis, et al., *Current Opinion in Solid State and Materials Science*, 16, 168-177, 2012, the contents of which are herein incorporated by reference in their entirety. In embodiments where the inventive solid electrolyte is in contact with an anode and cathode of the sodium-based battery but not incorporated into the cathode, the sodium-based battery may employ, for example, a sodium inorganic material as the active material in the cathode. Some examples of sodium inorganic materials include, for example, $NaFeO_2$, $NaMnO_2$, $NaNiO_2$, and $NaCoO_2$. Other cathode materials for sodium-based batteries include transition metal chalcogenides, such as described in U.S. Pat. No. 8,906,542, and sodium-lithium-nickel-manganese oxide materials, such as described in U.S. Pat. No. 8,835,041, the contents of which are herein incorporated by reference in their entirety.

In another embodiment, the battery is a magnesium or calcium metal battery or Mg-ion or Ca-ion battery in which any of the solid electrolyte compositions described above can be incorporated, either in contact with or as part of the anode and/or cathode. In the Mg-based or Ca-based battery, any of the Mg-containing or Ca-containing ionically conductive compositions described above, respectively, can be incorporated as a solid electrolyte in contact with the anode (negative electrode) and cathode (positive electrode) of the Mg-based or Ca-based battery. Alternatively, any of the Mg-containing or Ca-containing compositions described above can be incorporated into a cathode of the Mg-based or Ca-based battery, and the anode and cathode in contact with any of the above-described inventive solid electrolytes or any of the liquid or solid electrolytes known in the art.

Magnesium metal batteries are well known in the art, such as described in, for example, S.-B. Son et al., *Nature Chemistry*, 10, 532-539, 2018, the contents of which are herein incorporated by reference. Magnesium-ion batteries are also well known in the art, such as described in, for example, M. M. Huie, et al., *Coordination Chemistry Reviews*, vol. 287, pp. 15-27, March 2015; S. Tepavcevic, et al., *ACS Nano*, DOI: 10.1021/acsnano.5b02450, Jul. 14, 2015; *Beilstein J. Nanotechnol.*, 5, 1291-1311, 2014; and U.S. Pat. No. 9,882,245, the contents of which are herein incorporated by reference in their entirety. The magnesium battery may contain any of the components typically found in a magnesium battery, including cathode (positive) and anode (negative) electrodes, current collecting plates, and a battery shell, such as described in, for example, U.S. Pat. Nos. 8,361,661, 8,722,242, 9,012,072, and 9,752,245, the contents of which are incorporated herein by reference in their entirety. The positive electrode can include, as an active material, for example, a transition metal oxide or transition metal sulfide material, such as the composition $M_xMo_6T_8$, wherein M is at least one metal selected from alkaline earth and transition metals, T is selected from at least one of sulfur, selenium, and tellurium, and x is a value of 0 to 2. The negative electrode is generally a magnesium-containing electrode, which may include magnesium in elemental or divalent form. In elemental form, the magnesium may be either in the absence of other metals (i.e., substantially or completely pure magnesium, except for a possible trace of other metals, e.g., up to 1, 0.5, or 0.1 wt %) or in the form of a magnesium alloy, e.g., AZ31, AZ61, AZ63, AZ80, AZ81, ZK51, ZK60, ZC63, or the like. In some embodiments, the negative electrode can be or include a magnesium intercalation material, which may, before operation, not yet include magnesium intercalated therein. Some examples of magnesium intercalation materials include any of the materials described above for the positive electrode, anatase or rutile $TiO_2$, $FeS_2$, $TiS_2$, or $MoS_2$. Ca-ion batteries are also known in the art, such as described in Md. Adil et al., *ACS Appl. Mater. Interfaces*, 12(10), 11489-11503, 2020, the contents of which are herein incorporated by reference.

Zinc metal batteries are known in the art, such as described in, for example, F. Wang et al., *Nature Materials*, 17, 543-549, 2018, the contents of which are herein incorporated by reference. Zinc-ion batteries are also well known in the art, such as described, for example, in U.S. Pat. No. 8,663,844 and B. Lee et al., *Scientific Reports*, 4, article no. 6066 (2014), the contents of which are herein incorporated by reference. The cathode can include, for example, a composition based on manganese dioxide, and the anode may be zinc or zinc alloy. In the zinc-based battery, any of the zinc-containing ionically conductive compositions described above can be incorporated as a solid electrolyte in contact with the anode (negative electrode) and cathode (positive electrode) of the zinc-based battery. Alternatively, any of the zinc-containing compositions described above can be incorporated into a cathode of the zinc-based battery (typically admixed with a binder material), and the anode and cathode in contact with any of the above-described inventive solid electrolytes or any of the liquid or solid electrolytes known in the art.

The battery may be an aluminum metal or aluminum-ion battery. Aluminum-ion batteries are well known in the art, such as described, for example, in U.S. Pat. No. 6,589,692 and WO 2013/049097, the contents of which are herein incorporated in their entirety. The cathode can include, for example, a graphitic, manganese oxide (e.g., $Mn_2O_4$), or vanadium oxide material cathode, and the anode may be aluminum or aluminum alloy. In the case of an Al-ion battery, any of the Al-containing compositions described above can be incorporated as a solid electrolyte in contact with the anode (negative electrode) and cathode (positive electrode) of the Al-ion battery. Alternatively, any of the Al-containing compositions described above can be incorporated into a cathode of the Al-ion battery (typically admixed with a binder material), and the anode and cathode in contact with any of the above-described inventive solid electrolytes or any of the liquid or solid electrolytes known in the art. The battery may analogously be a copper-based or silver-based battery, in which case any of the Cu-containing or Ag-containing ionically conductive compositions described earlier above can be incorporated as a solid electrolyte in the battery.

In another aspect, the present disclosure is directed to methods for producing any of the ionically conductive compositions described above. Notably, the method excludes sputtering processes, pulsed laser deposition, atomic layer deposition, and chemical vapor deposition. In the method, a solid precursor material is subjected to a thermal process in which the precursor material is at least partially (or fully) vaporized and undergoes atomic rearrangement and subsequent cooling (condensation) to result in production of the ionically conductive composition, which may be particles or a continuous film, as described above. If the precursor material is not completely vaporized, then the remaining portion of the precursor material is typically in a melted (liquefied) state. Although not typical, a remaining portion of solid precursor may possibly undergo sublimation if subjected to sufficiently reduced pressure. The temperature at which the solid precursor material is at least partially vaporized is variable since different precursor materials can have very different melting and vaporization temperatures. Depending on the precursor composition, the precursor material may be subjected to a temperature of at least or above, for example, 400, 500, 600, 700, 800, 900, 1000, 1200, 1500, 2000, 2500, or 3000° C., or a temperature within a range bounded by any two of the foregoing temperatures. The method can produce a solid electrolyte having any of the compositions, particle sizes, particle shapes, film morphologies, or film thicknesses described above, or combined selections thereof, as desired. Any of the compositions described above (e.g., as delineated in the first through sixth particular embodiments described above) can be produced by the methods described herein. Notably, in one embodiment, the method described herein is practiced under reduced pressure (e.g., at least or above $10^{-4}$, $10^{-3}$, or $10^{-2}$ Torr but less than 0.1 or 1 Torr, or less than 1 atm), while in another embodiment, the method is practiced without employing a reduced pressure. For purposes of the present invention, a high vacuum (e.g., at or less than $10^{-5}$ or $10^{-6}$ Torr) is avoided. Moreover, the method described herein can be practiced at standard pressure, typically about 1 atm.

In the method, a precursor material is first selected which contains all of the elements to be included in the ionically conductive composition. In one set of embodiments, the precursor material is a single solid material that contains all of the elements, in appropriate molar ratios, for producing an ionically conductive composition containing the same elements in the same molar ratios. Although the precursor material and product may have the same elements in the same molar ratios, the process described herein has been unexpectedly found to rearrange the atoms in such a manner that modulates the extent of crystallinity or amorphous character, which in turn can beneficially affect the ionic conductivity, and the rearrangement can also result in nanoparticles of such compositions, which has thus far not been possible and which can also have a beneficial effect on the ionic conductivity. In another set of embodiments, the precursor material is composed of two or more solid materials that together contain all of the elements, in appropriate molar ratios, for producing an ionically conductive composition containing the same elements in the same or similar molar ratios.

For example, the precursor material may be a single material or mixture of materials containing at least one element selected from the group consisting of alkali metal, alkaline earth metal, aluminum, zinc, copper, and silver in combination with at least two elements selected from the group consisting of oxygen, sulfur, silicon, phosphorus, nitrogen, boron, gallium, indium, tin, germanium, arsenic, antimony, bismuth, transition metals, and lanthanides. In more specific embodiments, the precursor material may be a single material or mixture of materials containing at least one of alkali metal atoms and alkaline earth metal atoms in combination with at least two elements selected from the group consisting of oxygen, sulfur, silicon, phosphorus, nitrogen, boron, aluminum, gallium, indium, tin, germanium, arsenic, antimony, bismuth, transition metals, and lanthanide atoms. The precursor is subjected to a thermal process in which the precursor material is at least partially vaporized to undergo atomic rearrangement and subsequently cooled to result in production of the ionically conductive particles, wherein the ionically conductive particles have a composition containing the same elements in the same or similar molar ratios as in the precursor material, i.e., comprising at least one of alkali metal atoms and alkaline earth metal atoms in combination with at least two elements selected from the group consisting of oxygen, sulfur, silicon, phosphorus, nitrogen, boron, aluminum, gallium, indium, tin, germanium, arsenic, antimony, bismuth, transition metals, and lanthanide atoms. In the case of producing particles of any of the sizes described earlier above, e.g., 10-300 nm, the vaporized precursor is quenched (cooled) by the action of a flowing gas, such as nitrogen, argon, helium, or ammonia. The cooling action results in condensation of the vapors with simultaneous production of the particles. Notably, the quench rate can be appropriately modulated to adjust the level of crystallinity or amorphous character, with faster quench rates resulting in more amorphous character. The quench rate can be increased (i.e., cooling time decreased) by use of faster flow rates, e.g., 150-270 L of gas/min. The quenching gas may also incorporate one or more elements contained therein into the ionically conductive composition being produced. Thus, the quenching gas can be selected, based on its composition, to incorporate one or more elements into the composition. The carrier gas or plasma itself may also contribute to the composition. For example, the quenching gas may include ammonia or other nitrogen-containing gas in order to incorporate nitrogen into the composition. Nitrogen may also be incorporated by use of a nitrogen plasma. The method can be configured to alternatively produce a continuous film of the ionically conductive material by quenching (cooling) the at least partially vaporized precursor material on a substrate to form the ionically conductive continuous film on the substrate. In the film production process, a quenching gas is typically not used, in order to permit the condensation of ionically conductive material on the substrate. The method is capable of producing a film having any of the compositions, degree of crystallinity, morphologies, and thicknesses described earlier above.

The thermal process can be any process capable of heating a solid inorganic material to its vaporization temperature without using a vacuum, and further capable of rapidly quenching the vaporized precursor. In one embodiment, the thermal process may be a flame-based method, except that a flame spray pyrolysis method is generally not considered for purposes of the present invention. In another embodiment, the thermal process is a non-flame plasma process, such as an inductive coupled plasma (ICP) process. The ICP process is well known in the art, as described in, for example, J. Hopwood, *Plasma Sources Science and Tech-* nology, vol. 1, no. 2, 109, 1992 and T. Okumura, *Physics Research International*, vol. 2010, Article ID 164249, doi: 10.1155/2010/164249 (2010), the contents of which are herein incorporated by reference.

In some embodiments, the particles of ionically conductive material are consolidated by any suitable method, e.g., pressing with or without application of heat, to form a film constructed of bonded (e.g., sintered) particles. Other shapes (e.g., block) may be produced using such a process. Any of the processes known in the art useful in the consolidation and densification of powders is considered herein. The pressing process should apply sufficient energy to fuse and possibly densify the powder, but typically without the heat and time necessary to induce crystallization and/or phase separation. In some embodiments, a sonic spray method or sintering process enhanced by a high field or current is used.

In other embodiments, the particles are used as feed material in an additive manufacturing (AM) process to produce an object from the particles. The AM process may be any of the AM processes well known in the art, such as a direct AM process (e.g., selective laser sintering, selective laser melting, or electron beam melting) or indirect AM process (e.g., binder jetting process). The binder jetting process is described in detail in, for example, U.S. Pat. Nos. 10,040,216 and 6,036,777, the contents of which are herein incorporated by reference in their entirety. In the binder jetting process, a powder (i.e., particles), as described above, is fed into an additive manufacturing device (AMD) as a build material. The powder is eventually dispensed as a layer of build material on a vertically movable platform within the additive manufacturing device. A binder is fed into the AMD separately from the powder so that the two components are not in contact when fed into the AMD. In some embodiments, the binder is also ionically conductive. The binder is routed to a printhead positioned over the bed of powder. Based on instructions provided by a computer program, as generally provided by a computer-aided manufacturing (CAM) software package, the printhead is directed to dispense selectively positioned droplets of the binder onto the powder bed to form a first layer of the article being built. The printhead can be an inkjet printhead, as well known in the art. Thus, the droplets of the binder can be precisely positioned in various locations on the powder bed to form a first layer of the article being built. As well known in the art of binder jetting, once a first layer of the article is built, the platform holding the powder bed is lowered by an amount equivalent to a layer thickness. A subsequent layer of the object is built by spreading a new layer of powder and then selectively depositing a second set of selectively positioned droplets of the binder. The platform holding the powder bed is then lowered again by another layer thickness, more powder is spread, and the process is continued until a preform having the shape of the object to be built is produced. The preform is constructed of particles of the powder bonded together with the binder. After producing the preform, as described above, the preform can be subjected to a curing step to remove any solvent, thereby hardening the object. The binder is also typically pyrolyzed or vaporized or otherwise removed from the preform. After the curing step, the object may or may not be subjected to a sintering step and/or an annealing step.

The ionically conductive compositions described above may also be useful in a number of other applications in which an ionically conductive composition can be beneficial. Some examples of other applications include fuel cells (e.g., as a solid membrane anode/cathode separator) and sensor materials, such as gas sensors and auto exhaust sensors. Silver and copper are known to have particularly high ionic mobility in solid electrolytes. In some embodiments, silver- and copper-containing ionic conductors, particularly in amorphous form, may be used as memristors.

Examples have been set forth below for the purpose of illustration and to describe certain specific embodiments of the invention. However, the scope of this invention is not to be in any way limited by the examples set forth herein.

Examples

Synthesis of LISICON and LISIPON Nanopowders

The following work demonstrates the use of an inductively coupled plasma (ICP) torch (also known as "inductive plasma torch," i.e., IPT) to synthesize 1) spherical nanopowders of crystalline $Li_{3.5}Si_{0.5}P_{0.5}O_4$ (LISICON) and 2) 100% amorphous LiSiPON nano-powders in the LIPON family ($Li_{2.7}Si_{0.7}P_{0.3}O_{3.17}N_{0.22}$ demonstrated). These powders can be synthesized from either pre-reacted powders or a mixed precursors for one-step synthesis and spheroidization. The technique also requires no excess Li to achieve the desired compositions. The nano-powders produced are spherical and have a tunable size distribution ranging from 10-300 nm, or more particularly, 20-200 nm. As a demonstration of their usefulness for advanced manufacturing, the $Li_{3.5}Si_{0.5}P_{0.5}O_4$ powders can be sintered into a dense compact at 800° C., well below the traditional sintering temperature for this material between 1000-1100° C. Pressing and sintering of these powders yields membranes with an ionic conductivity between 0.5-5 µS/cm. Whereas the ionic conductivities of these powders is modest, this proof-of-principle demonstrates an exciting and unique method for the advanced manufacturing of both ceramic and glass inorganic ionic conductors including Li—La—Zr—O (LLZO) and sulfide based LISICON materials, such as $Li_{3.5}Si_{0.5}P_{0.5}S_4$, with higher ionic conductivities.

The plasma synthesis process utilized in this work involves first spex milling the precursor powders together to get a precursor with a roughly uniform particle size and that can flow freely. This powder was then directly injected into an inductively coupled plasma torch to vaporize the material. Once the powder emerges from the plasma, a large volume of $N_2$ gas (~225 L/min) was used to quench the material. As the material quenches, it condenses into a homogeneous spherical nano-powder product. A schematic of the process is presented in FIG. 1A. FIGS. 1B and 1C show a side-by-side comparison of scanning electron microscope (SEM) images of the precursor and the product for the amorphous LiSiPON, respectively, both of which will be discussed in detail later. The insets in the SEM images are photographs of 1 g of the precursor and 1 g of the product. The first key difference is in the color, which has changed from white (in the precursor) to dark brown (in the product). The second key difference is in the packing density, which has about decreased by a factor of 2 in the product, which is indicative of a powder with a finer particle size. The SEM images also show that, whereas the precursor has particle sizes on the order of several microns, the product has particles that are on the order of about 90 nm in diameter with some level of polydispersity.

More specifically, the precursors used in the IPT processing were: lithium oxide, lithium pyrophosphate, lithium orthosilicate, and silicon nitride. Air-stable precursors (i.e., all but $Li_2O$) were milled together in ethanol for 30 min using a Spex™ 8000 M mixer mill. The air-stable precursors were vacuum dried at 80° C. overnight. Any lithium oxide was added to the dry powder mixture in a glovebox, and the powders were mixed for 2 hours using a shaker-mixer. Final precursor powder mixtures were loaded without air exposure into a spiral vibratory feeder.

IPT processing was performed using a TekNano™ 15 inductive plasma torch system with a high-flow, rapid quench reactor designed for nanoparticle production. The following events occur during the IPT process: (i) the vibratory powder feeder feeds precursor powder with an Ar (or Ar—NH$_3$ mixture) carrier gas axially into the inductive plasma torch, (ii) the powder volatilizes at torch temperatures up to 10,000 K, (iii) quench gases radially impinge on the feeder gas stream in the nanoreactor to form nanoparticles, (iv) any coarse powder is collected downstream in a cyclone separator, and (v) the nanoparticle product is finally collected on a nanoporous filter. The product was valved off and removed to a glovebox without air exposure. The vibratory feeder fed powder at 2-3 g/min.

The typical gas flow conditions during the IPT processing runs were: carrier gas 4 L/min Ar, central gas 10 L/min Ar, sheath gas 30 L/min N$_2$ and 5 L/min Ar, primary quench gas 50 L/min N$_2$, and secondary quench gas 150-275 L/min N$_2$. For one IPT run, an 8% ammonia/balance N$_2$ gas mixture was supplied for the carrier gas stream at 11.5 L/min. The torch power was 15 kW. During the run, the pressure ranged from 15 to 17 psi and temperatures by the cyclone separator inlet were 300-450° C.

After considerable experimentation to identify the precursor and process conditions, several nanopowders were produced with the IPT. These powders included partially amorphous Li$_4$P$_2$O$_7$, crystalline Li$_3$PO$_4$, partially amorphous Li$_4$SiO$_4$, partially amorphous Li$_{3.5}$Si$_{0.5}$P$_{0.5}$O$_4$, partially amorphous Li$_2$Si$_{0.33}$P$_{0.66}$O$_{2.66}$N$_{0.44}$, partially amorphous Li$_{2.1}$Si$_{0.66}$P$_{0.33}$O$_{2.93}$N$_{0.18}$, fully amorphous Li$_{2.7}$Si$_{0.7}$P$_{0.3}$O$_{3.17}$N$_{0.22}$, and partially amorphous Li$_{3.6}$Si$_{0.8}$P$_{0.2}$O$_{3.48}$N$_{0.28}$. While most were synthesized using mixed precursors, Li$_3$PO$_4$, Li$_4$SiO$_4$, and Li$_4$P$_2$O$_7$ were synthesized from single phase precursors and Li$_{3.5}$Si$_{0.5}$P$_{0.5}$O$_4$ was synthesized from both a mixed and single-phase precursor material.

After the product was removed, the IPT system was carefully passivated before opening the system for cleaning. The nanoparticle LiSiPON products slowly react with moisture in the air to make a fairly noxious smelling byproduct. Special care should be taken in cleaning the IPT system and in handling LiSiPON materials.

TABLE 1

Precursors & final compositions of IPT nanomaterials

| Target Composition | Precursors | Process Power | Carrier Gas/Rate | Central Gas/Rate | Sheath Gas/Rate | Quench Gas/Rate | Feed Rate | Downstream Temp. | Processed Composition | % Crystallinity |
|---|---|---|---|---|---|---|---|---|---|---|
| Li$_4$P$_2$O$_7$ | Li$_4$P$_2$O$_7$ | 15 kW | Ar- 5 L/min | Ar-10 L/min | Ar-5 L/min, N$_2$-30 L/min | N$_2$-250 L/min | | 300° C. | Li$_{3.94}$P$_2$O$_7$ | 16 |
| Li$_4$P$_2$O$_7$ | Li$_4$P$_2$O$_7$ | 11 kW | Ar- 5 L/min | Ar- 8 L/min N$_2$- 2 L/min | Ar-35 L/min | Ar-225 L/min | | 350° C. | Li$_x$P$_2$O$_y$N$_{0.4}$ | |
| Li$_3$PO$_4$ | Li$_3$PO$_4$ | 15 kW | Ar- 5 L/min | Ar-10 L/min | Ar-5 L/min, N$_2$-30 L/min | N$_2$-200 L/min | 20 g/min | 285° C. | | 100 |
| Li$_4$SiO$_4$ | Li$_4$SiO$_4$ | 15 kW | Ar- 4 L/min | Ar-10 L/min | Ar-5 L/min, N$_2$-30 L/min | N$_2$-275 L/min | 2.2 g/min | 315° C. | | 25 |
| Li$_{3.5}$Si$_{0.5}$P$_{0.5}$O$_4$ | Li$_3$PO$_4$, Li$_4$SiO$_4$ | 15 kW | Ar- 4 L/min | Ar-10 L/min | Ar-5 L/min, N$_2$-30 L/min | N$_2$-275 L/min | 1 g/min | 390° C. | Li$_x$Si$_{0.3}$P$_{0.7}$O$_y$ | 60 |
| Li$_{3.5}$Si$_{0.5}$P$_{0.5}$O$_4$ | Li$_3$PO$_4$, Li$_4$SiO$_4$ | 12 kW | Ar- 4 L/min | Ar- 8 L/min N$_2$ - 2 L/min | Ar-35 L/min | Ar-275 L/min | | 390° C. | | |
| Li$_{3.5}$Si$_{0.5}$P$_{0.5}$O$_4$ | Li$_{3.5}$Si$_{0.5}$P$_{0.5}$O$_4$ | 12 kW | Ar- 4 L/min | Ar-10 L/min | Ar-10 L/min, N$_2$-25 L/min | N$_2$-150 L/min | 1.5 g/min | 470° C. | | 52 |
| Li$_2$Si$_{0.33}$P$_{0.66}$O$_{2.66}$N$_{0.44}$ | Li$_3$PO$_4$, Si$_3$N$_4$ | 15 kW | Ar- 4 L/min | Ar-10 L/min | Ar-5 L/min, N$_2$-30 L/min | N$_2$-225 L/min | 0.8 g/min | 395° C. | Li$_x$Si$_{0.28}$P$_{0.72}$O$_y$N$_{0.2}$ | 52 |
| Li$_2$Si$_{0.7}$P$_{0.3}$O$_{2.5}$N$_{0.4}$ | Li$_4$SiO$_4$, Li$_4$P$_2$O$_7$, Si$_3$N$_4$ | 15 kW | Ar- 4 L/min | Ar-10 L/min | Ar-5 L/min, N$_2$-30 L/min | N$_2$-225 L/min | 3 g/min | 360° C. | Li$_{2.1}$Si$_{0.66}$P$_{0.33}$O$_{2.93}$N$_{0.18}$ | 21 |
| Li$_{2.8}$Si$_{0.8}$P$_{0.2}$O$_{2.5}$N$_{0.66}$ | Li$_2$O, Si$_3$N$_4$, Li$_4$SiO$_4$, Li$_4$P$_2$O$_7$ | 15 kW | Ar- 4 L/min | Ar-10 L/min | Ar-5 L/min, N$_2$-30 L/min | N$_2$-275 L/min | 2.9 g/min | 300° C. | Li$_{2.7}$Si$_{0.7}$P$_{0.3}$O$_{3.17}$N$_{0.22}$ | 0.0 |

TABLE 1-continued

Precursors & final compositions of IPT nanomaterials

| Target Composition | Precursors | Process Power | Carrier Gas/ Rate | Central Gas/ Rate | Sheath Gas/ Rate | Quench Gas/ Rate | Feed Rate | Down-stream Temp. | Processed Composition | % Crystal-linity |
|---|---|---|---|---|---|---|---|---|---|---|
| $Li_{3.6}Si_{0.8}P_{0.2}O_{2.6}N_{0.84}$ | $Li_2O$, $Si_3N_4$, $Li_4SiO_4$, $Li_4P_2O_7$ | 12 kW | 10% $NH_3$ 90% Ar-11.5 L/min | Ar-10 L/min | Ar-10 L/min, $N_2$-25 L/min | $N_2$-150 L/min | 2 g/min | 450° C. | $Li_xSi_{0.84}P_{0.16}O_yN_{0.28}$ | 14 |

Modulating the Degree of Crystallinity by Modulating the Quench Rate

One of the key advantages of the present high temperature plasma process is its potential for forming either crystalline or amorphous nanopowder products. As silicates and phosphates are the two key glass formers in most traditional glass compositions, the science of their amorphization is well understood. For silicate and phosphate compositions with a relatively low alkali content, glass formation is straightforward. The same is not true for the high Li content materials, particularly those that have an ortho character, such as $Li_3PO_4$ and $Li_4SiO_4$. In order to make these materials amorphous, very fast quench rates were needed. Such quenches rates are more easily achievable with sputtering, pulsed laser deposition, and splat quenching. In the present case, initial studies focused on understanding the quenching capability of the plasma system and determining whether or not the quenching rates needed to form amorphous materials with high Li content could be achieved. FIG. 2A is an x-ray diffraction (XRD) pattern of the precursor and plasma-processed $Li_3PO_4$. FIG. 2B is an XRD pattern of the precursor and plasma-processed $Li_4SiO_4$. In a series of first tests attempted with $Li_3PO_4$, the product had virtually the same amount of crystalline character as the $Li_3PO_4$ precursor (see FIG. 2A). For the $Li_4SiO_4$, the product exhibited some broad crystalline peaks characteristic of a nanomaterial, but also exhibited a large amorphous background (see FIG. 2B). A rough analysis and comparison of the integrated intensity of the amorphous background and the crystalline peaks gives a rough estimate of 25% crystallinity.

Figures 3A, 3B:
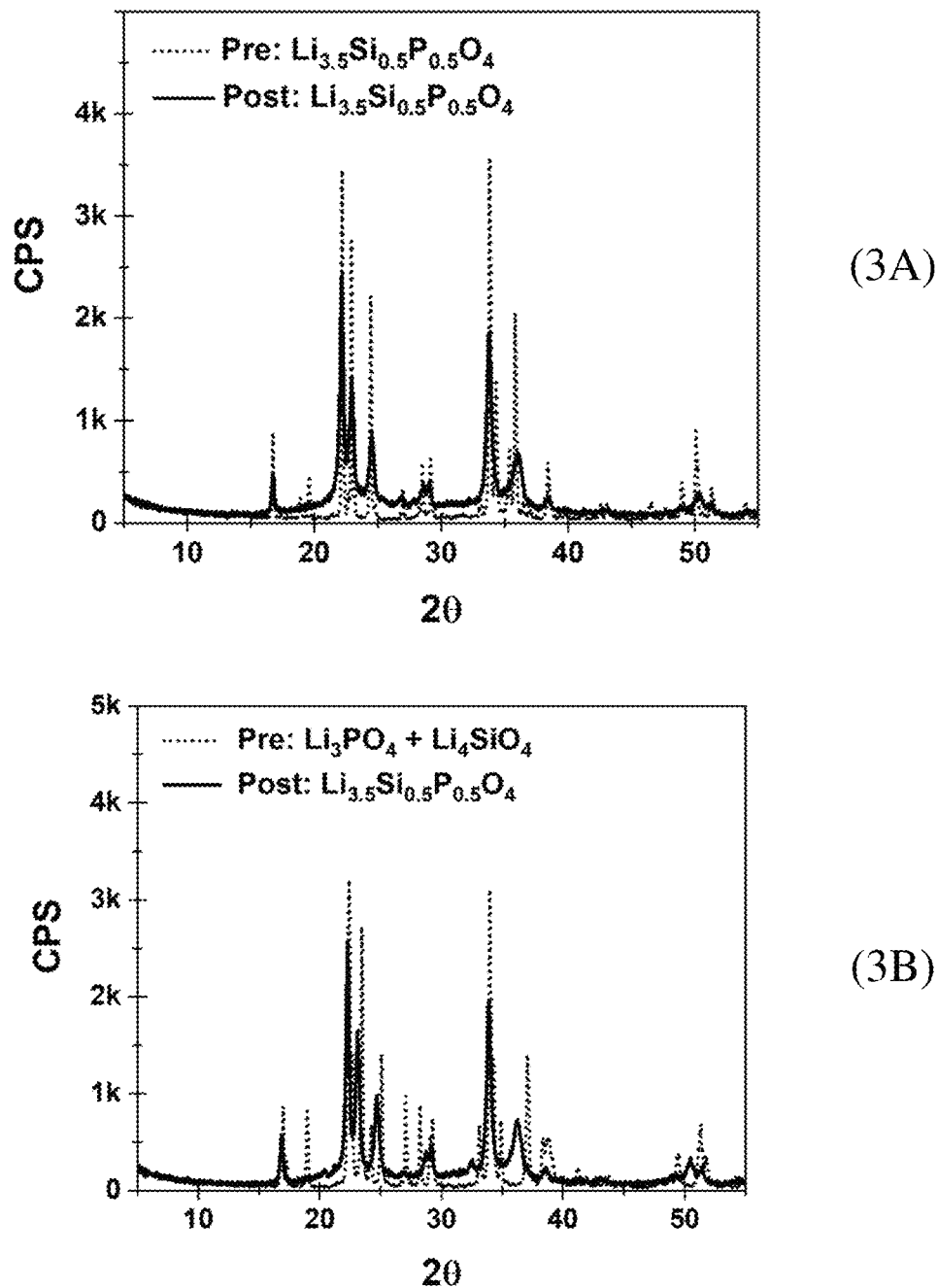
FIGS. 3A-3D.
Figure 3C:
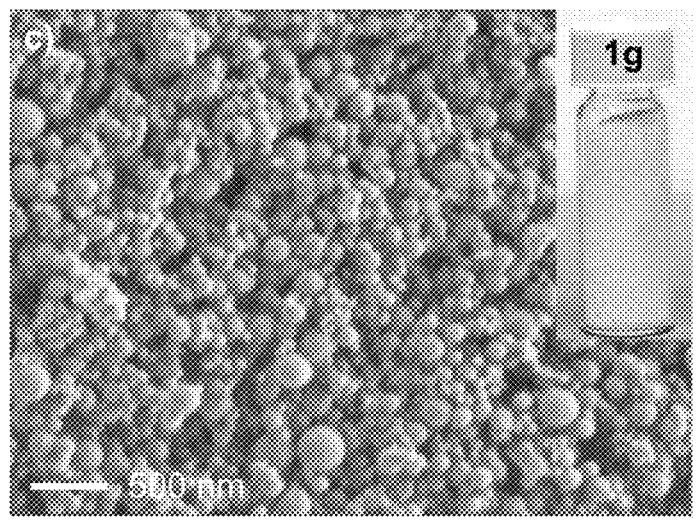
Figure 3D:
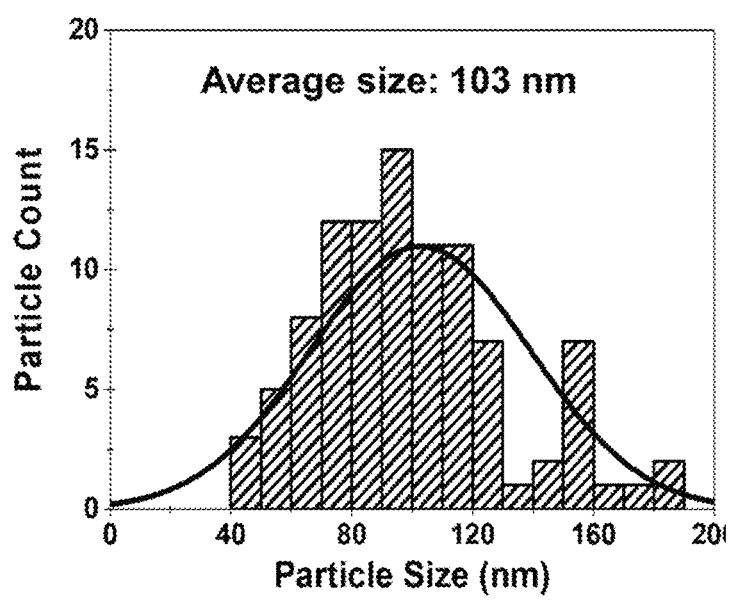

For the crystalline material, the target was the ionically conductive LISICON material $Li_{3.5}Si_{0.5}P_{0.5}O_4$. In order to make this material, two routes were attempted: first, using a conventional pre-synthesized $Li_{3.5}Si_{0.5}P_{0.5}O_4$, and second, by using a mix of the precursors $Li_3PO_4$ and $Li_4SiO_4$. From both synthesis routes, it was possible to create virtually the same nanocrystalline $Li_{3.5}Si_{0.5}P_{0.5}O_4$ product. This result was verified first with XRD, as presented in FIGS. 3A and 3B, respectively. Both materials are estimated to be between 50-60% crystalline and have the crystal structure of the LiSICON material $Li_{3.5}Si_{0.5}P_{0.5}O_4$, as evident in FIG. 3A. FIG. 3C shows an SEM image of the $Li_{3.5}Si_{0.5}P_{0.5}O_4$ nanopowder synthesized from the homogenous precursor. As shown in FIG. 3C, the $Li_{3.5}Si_{0.5}P_{0.5}O_4$ nanopowder has a particle size ranging from 40 nm to 200 nm. The inset photograph of the material (1 g of the material in a vial), shows that the material is a relatively fluffy white powder. FIG. 3D is a graph showing a particle size analysis for the $Li_{3.5}Si_{0.5}P_{0.5}O_4$ powder shown in the SEM image in FIG. 3C.

The next goal was to determine if the above described process could be used to produce an amorphous glassy electrolyte, such as LIPON. Although several initial tests were performed to attempt preparation of LIPON itself, they were not successful. There were two key challenges: first, as previously presented in FIGS. 2A-2B, the quench rates accessible with this plasma technique are insufficient to fully quench $Li_3PO_4$ to a glass, and second, it is very difficult to incorporate nitrogen (N) into the films. In sputtering, N is incorporated into the films by the use of a reactive nitrogen plasma. Although the present technique also uses a plasma, and in theory could be designed to be used with a nitrogen plasma, the torch configuration and other factors made ignition of a nitrogen plasma highly challenging or impossible. An attempt was made to incorporate nitrogen by using a mixed gas of 80% Ar and 20% N for the plasma. Although the process was successful in producing a nanopowder, there was no conclusive evidence of nitrogen incorporation into the film. In a second attempt, a $Li_3N$ precursor was used, but the $Li_3N$ immediately reacted exothermically with the other precursors and was not processible in the plasma. As part of a further effort, $Si_3N_4$ was used as one of the precursor materials. Using a combination of $Li_3PO_4$ and $Si_3N_4$, some N was successfully incorporated into a final product with an estimated composition of $Li_2Si_{0.33}P_{0.66}O_{2.66}N_{0.44}$. The presence of N in the product was confirmed with EDX. Although the sample contained N, the XRD data showed that the material was still partially crystalline with a crystal structure of the original $Li_3PO_4$. There was some $Si_3N_4$ present in the product, likely due to its high melting temperature, but it is a small fraction of the original $Si_3N_4$ in the material. Having established that the $Si_3N_4$ can allow for the incorporation of N into the films, the next task was to ensure a fully amorphous product. As the previous attempts to make an amorphous material relied on phosphate-rich compositions that are inherently more difficult to crystallize, the next step was to utilize the $Si_3N_4$ but in a more silicon-rich material.

Figure 4A:
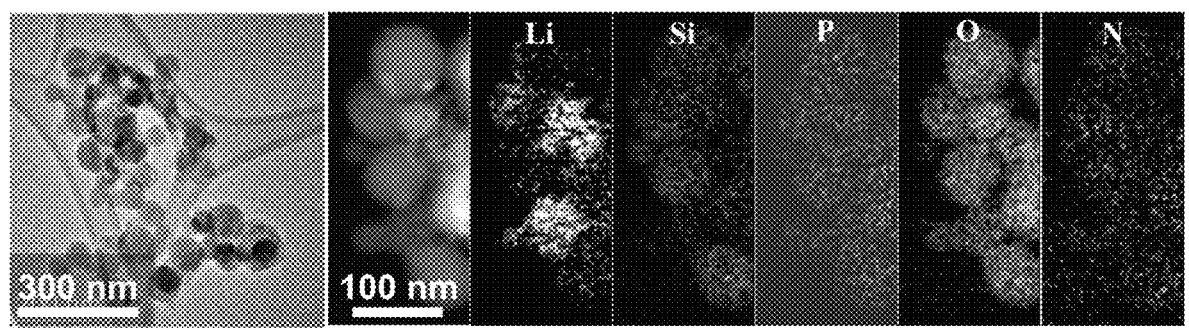
FIGS. 4A-4E.
Figure 4B:
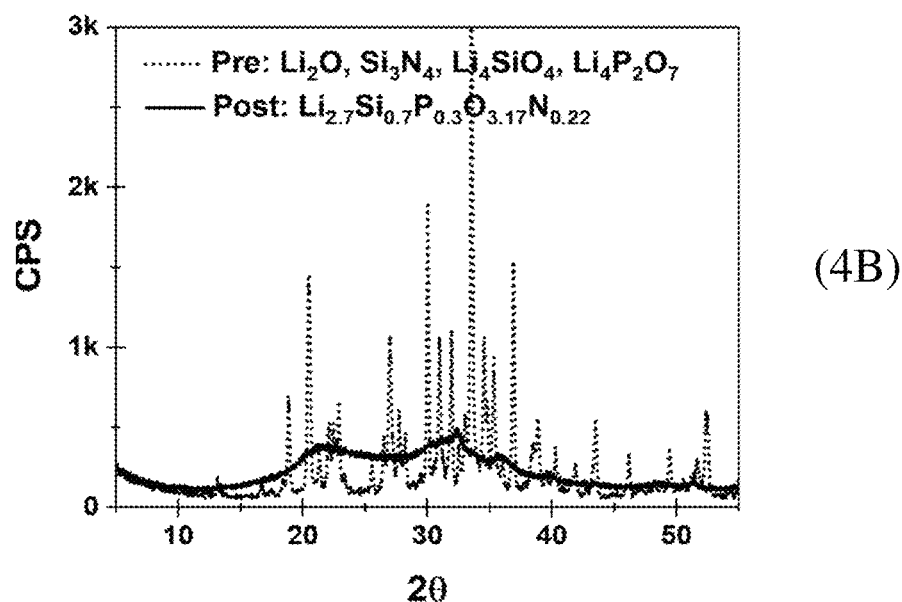
Figure 4C:
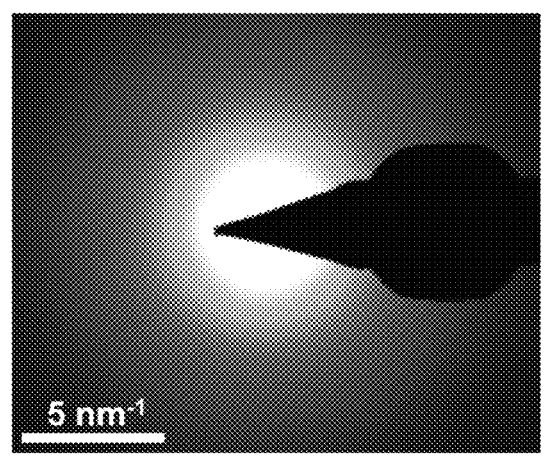

With the above results known, a fully amorphous N-containing material was successfully synthesized by using a precursor that contained $Li_2O$, $Si_3N_4$, $Li_4P_2O_7$, and $Li_4SiO_4$ with a predicted stoichiometry of $Li_{2.8}Si_{0.8}P_{0.2}O_{2.5}N_{0.66}$. FIG. 4A shows some TEM images of the LiSiPON nanopowder along with EELS data (micrographs) showing a uniform composition containing each of the precursor elements, i.e., Li, Si, P, O, and N. In order to measure the final composition, ICP was used to test the Li:P ratio and EDX was used to measure the Si, P and N content. Oxygen (O) content was determined by charge balance. As measured, the final composition was $Li_{2.7}Si_{0.7}P_{0.3}O_{3.17}N_{0.22}$. There was very minimal Li loss, some preferential incorporation of P, and some N loss. Particularly notable is the very small loss in Li content. Most traditional synthesis routes for Li-containing ceramics typically require a significant Li excess. Although the plasma-based process described herein can incorporate an appreciable amount of N into the final product, the significant nitrogen loss highlights the magnitude of the challenge in incorporating N with this process. With the incorporation of the higher Si content, a fully amorphous product was able to be produced, as shown in FIGS. 4B and 4C. FIG. 4B shows the XRD pattern of the product compared to the XRD pattern of the precursor. There are clearly no crystalline peaks in the product XRD pattern except a small one due to $Li_2CO_3$ formation on the surface due to the lack of an environmental XRD and the need for long scan times due to the amorphous nature of the material.

The fully amorphous nature of the product was confirmed with electron diffraction in the TEM image shown in FIG. 4C. The electron diffraction shows several rings, i.e., at 1.35, 1.60, 1.85, and 2.68 Å. The lack of a distinct diffraction pattern indicates the material is amorphous. Similar to the prior semi-crystalline nanopowders, this amorphous powder has a size distribution from 40-200 nm with an average size of ca. 90 nm.

Figure 5:
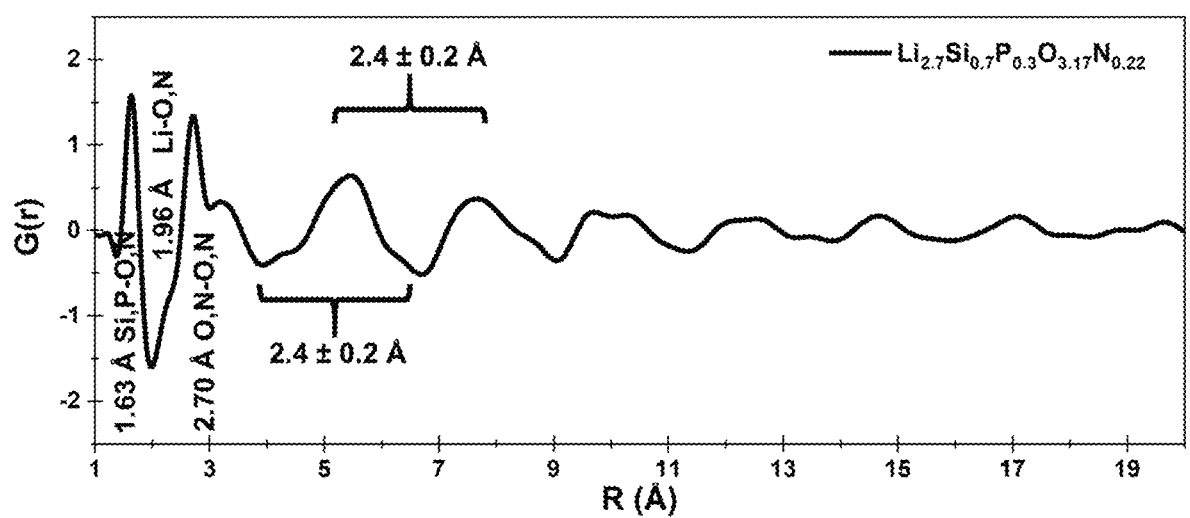
FIG. 5 is a graph plotting neutron pair distribution function of the nanopowder of composition $Li_{2.7}Si_{0.7}P_{0.3}O_{3.17}N_{0.22}$ with the peaks corresponding to Si,P—O,N at 1.63 Å; Li—O,N at 1.96 Å; and the O,N—O,N Å denoted. The periodic nature of the structure is also indicated (periodicity of about 2.4 Å).

The structure of the material was further determined using neutron scattering to generate a neutron pair distribution function as shown in FIG. 5. In the pair distribution function, several key peaks are identified including the Si,P—O,N peak at 1.63 Å, the Li—O,N peak at 1.96 Å, and the O,N—O,N peak at 2.7 Å. Beyond this first coordination shell, the material exhibits a periodic structure of alternating Li—O,N coordination and O,N—O,N coordination with an average periodicity of about 2.4 Å. This periodic structure decreases in intensity until there are no more correlations beyond about 20 Å.

Ionic Conductivity Measurements

Figure 6:
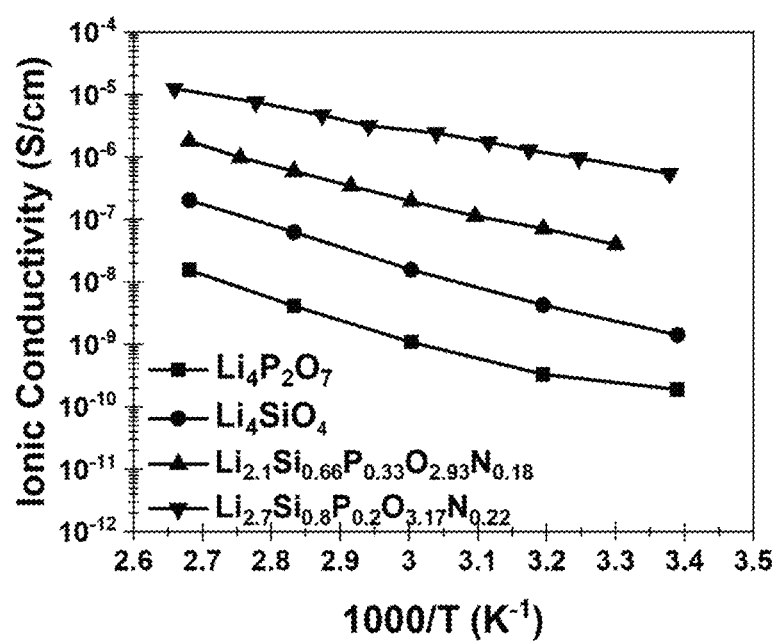
FIG. 6 is a graph plotting ionic conductivity of various nanopowders as a function of 1000/T ($K^{-1}$). The nanopowders measured are partially amorphous $Li_4P_2O_7$, $Li_4SiO_4$, and $Li_{2.1}Si_{0.66}P_{0.33}O_{2.93}N_{0.18}$, and fully amorphous $Li_{2.7}Si_{0.8}P_{0.2}O_{3.17}N_{0.22}$.

Preferably, the materials produced herein have an ionic conductivity value comparable or greater than that of LiPON. Electrical conductivity was measured on pressed pellets inside a polyimide die with stainless steel rams. The die was loaded with product powder (~0.5 g) and placed under pressure (>100 MPa) to decrease the contact resistance between particles. Resistance was measured between the two rams with impedance spectroscopy using a potentiostat at 0V with an excitation amplitude of 500 mV. Preliminary tests were used to determine the measured resistance as a function of pressure to identify the pressure necessary to reach a plateau in the measured resistance. The ionic conductivity of each powder was calculated using the electrical resistance, ram diameter, and compacted powder thickness. A heating mantle on the die was used to measure the ionic conductivity as a function of temperature to 100° C. The ionic conductivity data for some of these powders is provided in FIG. 6.

Figure 4D:
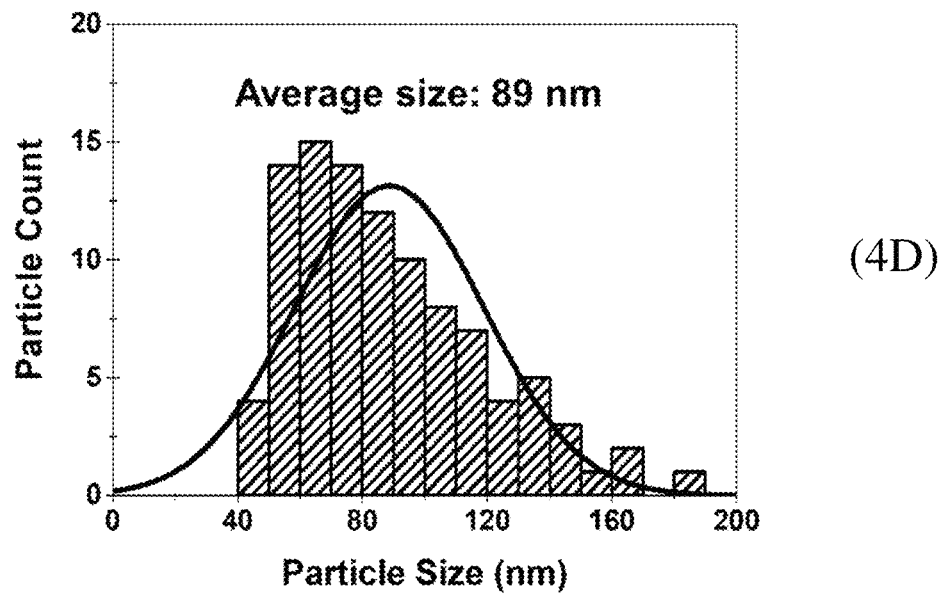
Figure 4E:
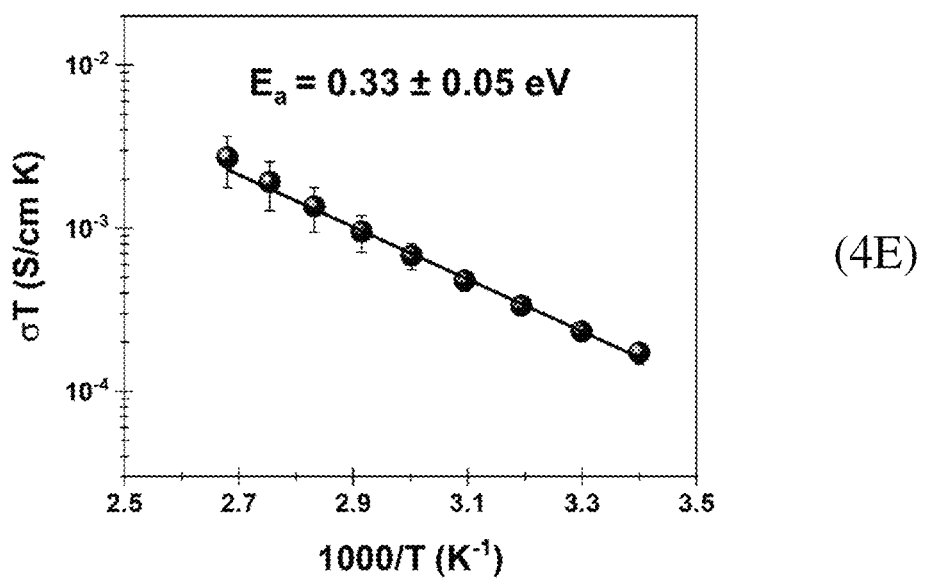

While the ionic conductivity is difficult to accurately probe without some form of post-processing to consolidate the powder into a compact state, simple warm-pressing (at 100° C.) resulted in pellets that were estimated to be ca. 70% dense and had a room temperature ionic conductivity of 0.5 µS/cm and an activation energy of 0.37 eV. Correcting for the density of the pellet gave an estimated room temperature ionic conductivity of ca. 0.8 µS/cm. Although the value is lower than the best ionic conductivities reported for LIPON (3 µS/cm), the 0.8 µS/cm value is well within the range of values typically observed for sputtered LIPON. FIG. 4D shows a particle size distribution for the plasma-produced $Li_{2.7}Si_{0.7}P_{0.3}O_{3.17}N_{0.22}$ material. FIG. 4E is a graph of the ionic conductivity of cold-pressed plasma-produced $Li_{2.7}Si_{0.7}P_{0.3}O_{3.17}N_{0.22}$ material.

As additional N is likely to increase the ionic conductivity of the material, one additional material synthesis was attempted using the same precursors but with a higher content of $Li_2O$ and $Si_3N_4$, with a predicted composition of $Li_{3.6}Si_{0.8}P_{0.2}O_{2.6}N_{0.84}$. In addition, 10% $NH_3$ was included in the carrier gas. Although a nanomaterial was successfully synthesized, the N content in the final product was only up to 0.28, still indicating a significant loss in the N from the precursor and no apparent N addition from the $NH_3$. It is possible that additional $NH_3$ will increase the N content in the final product.

Figures 7A, 7B, 7C, 7D:
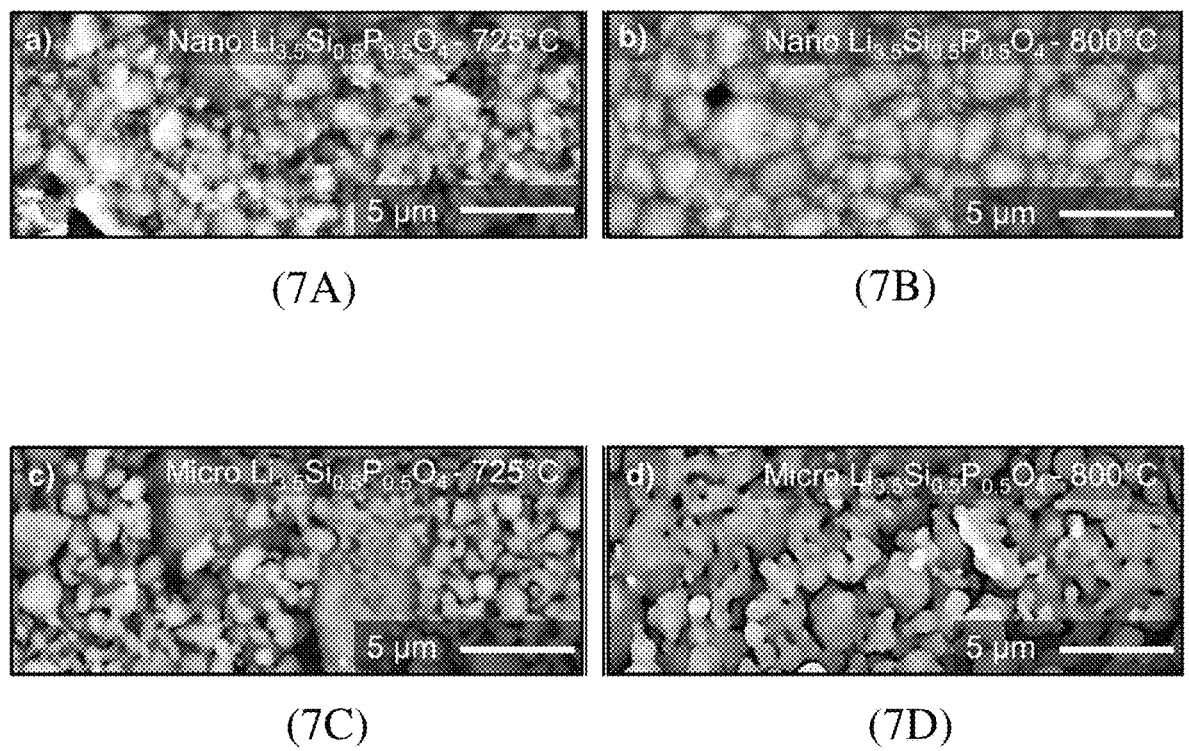
FIGS. 7A-7D.

Another area of interest is to use these materials in advanced manufacturing. The types of advanced processing and the conditions that can be used will be strongly dependent on the behavior of these materials when exposed to higher temperatures. FIGS. 7A-7D show a direct comparison of the effect of sintering on the presently produced nano-sized $Li_{3.5}Si_{0.5}P_{0.5}O_4$ particles vs. a traditionally prepared micron-sized $Li_{3.5}Si_{0.5}P_{0.5}O_4$ powder at 725° C. (FIG. 7A) and 800° C. (FIG. 7B). FIG. 7A is an SEM image of the nano-sized $Li_{3.5}Si_{0.5}P_{0.5}O_4$ particles sintered at 725° C. This is compared to a traditionally prepared micron-sized $Li_{3.5}Si_{0.5}P_{0.5}O_4$ powder sintered at 725° C. presented in FIG. 7C. FIG. 7B and FIG. 7D show SEM images of the nano-sized and traditionally prepared $Li_{3.5}Si_{0.5}P_{0.5}O_4$ particles sintered at 800° C. respectively. Whereas the micron scale material begins to sinter and forms necks, the nanoscale material sinters into large dense grains. This reduced sintering temperature is a key advantage that will be useful in advanced manufacturing.

CONCLUSION

The successful implementation of solid-state batteries will likely be determined by the ability to implement efficient and cost-effective advanced manufacturing techniques. Critical to those techniques is the quality of precursors available. This work has demonstrated the successful syntheses of solid-state electrolytes nanopowders that are both crystalline (LISICON) and amorphous (LiSiPON) by directly injecting either single phase or mixed precursors directly into a plasma torch. The nanopowders produced range in size from 40-200 nm in diameter, flow freely, and have a depressed sintering temperature compared to conventional ceramics of the same composition. These materials have ionic conductivities on the order of ~1 µS/cm, which is high enough to form thin separators for solid-state batteries. Furthermore, this technique can be used to synthesize nanopowder versions of a diverse number of other key battery materials, such as LLZO and $Li_{3.5}Si_{0.5}P_{0.5}S_4$, as well as cathode materials, such as $LiCoO_2$ and Li—Ni—Mn—Co—O compositions with and without N incorporation.

While there have been shown and described what are at present considered the preferred embodiments of the invention, those skilled in the art may make various changes and modifications which remain within the scope of the invention defined by the appended claims.

What is claimed is:

1. A composition comprising ionically conductive particles having a composition comprising at least one element selected from the group consisting of alkali metal, alkaline earth metal, aluminum, zinc, copper, and silver in combination with at least two elements selected from the group consisting of oxygen, sulfur, silicon, phosphorus, nitrogen, boron, gallium, indium, tin, germanium, arsenic, antimony, bismuth, transition metals, and lanthanides, wherein said ionically conductive particles have a size in a range of 10-300 nm, are at least partially amorphous and have a spherical shape.

2. The composition of claim 1, wherein the ionically conductive particles have a composition comprising lithium and oxygen atoms in combination with at least one element selected from the group consisting of silicon, phosphorus, nitrogen, and transition metal atoms.

3. The composition of claim 1, wherein the ionically conductive particles have a composition comprising lithium, silicon, and oxygen atoms in combination with at least one element selected from the group consisting of phosphorus, nitrogen, and transition metal atoms.

4. The composition of claim 1, wherein the ionically conductive particles have a composition comprising lithium, silicon, phosphorus, and oxygen atoms in combination with at least one element selected from the group consisting of nitrogen and transition metal atoms.

5. The composition of claim 1, wherein the ionically conductive particles have a composition comprising lithium, silicon, phosphorus, oxygen, and nitrogen atoms.

6. The composition of claim 1, wherein the ionically conductive particles are in consolidated form and shaped as a film.

7. The composition of claim 1, wherein the ionically conductive particles contain alkali metal atoms and tetrahedral oxyanion units, and the alkali metal atoms are included in an alkali metal to tetrahedral oxyanion molar ratio of at least 2.

8. The composition of claim 1, wherein the ionically conductive particles contain alkali metal atoms and tetrahedral oxyanion units, and the alkali metal atoms are included in an alkali metal to tetrahedral oxyanion molar ratio of at least 3.

9. The composition of claim 1, wherein the ionically conductive particles are fully amorphous.

10. The composition of claim 1, wherein the ionically conductive particles are at least 10% amorphous.

11. A battery comprising an anode, a cathode, and a solid electrolyte in contact with or as part of the anode and/or cathode, wherein the solid electrolyte comprises the composition of claim 1 conductive composition comprising at least one element selected from the group consisting of alkali metal, alkaline earth metal, aluminum, zinc, copper, and silver in combination with at least two elements selected from the group consisting of oxygen, sulfur, silicon, phosphorus, nitrogen, boron, gallium, indium, tin, germanium, arsenic, antimony, bismuth, transition metals, and lanthanides.

12. The battery of claim 11, wherein the particles are in consolidated form and shaped as a film.

13. The battery of claim 11, wherein said solid electrolyte comprises a continuous film.

14. The battery of claim 11, wherein the ionically conductive composition comprises lithium and oxygen atoms in combination with at least one element selected from the group consisting of silicon, phosphorus, nitrogen, and transition metal atoms.

15. The battery of claim 11, wherein the ionically conductive composition comprises lithium, silicon, and oxygen atoms in combination with at least one element selected from the group consisting of phosphorus, nitrogen, and transition metal atoms.

16. The battery of claim 11, wherein the ionically conductive composition comprises lithium, silicon, phosphorus, and oxygen atoms in combination with at least one element selected from the group consisting of nitrogen and transition metal atoms.

17. The battery of claim 11, wherein the ionically conductive composition comprises lithium, silicon, phosphorus, oxygen, and nitrogen atoms.

18. A method for producing the composition of claim 1, the method comprising subjecting a precursor material comprising at least one element selected from the group consisting of alkali metal, alkaline earth metal, aluminum, zinc, copper, and silver in combination with at least two elements selected from the group consisting of oxygen, sulfur, silicon, phosphorus, nitrogen, boron, gallium, indium, tin, germanium, arsenic, antimony, bismuth, transition metals, and lanthanides to a thermal process in which the precursor material is at least partially vaporized to undergo atomic rearrangement and subsequently cooled to result in production of the ionically conductive particles, wherein the ionically conductive particles have a composition comprising at least one of alkali metal atoms and alkaline earth metal atoms in combination with at least two elements selected from the group consisting of oxygen, sulfur, silicon, phosphorus, nitrogen, boron, aluminum, gallium, indium, tin, germanium, arsenic, antimony, bismuth, transition metals, and lanthanide atoms, and wherein said ionically conductive particles have a size in a range of 10-300 nm.

19. The method of claim 18, wherein the thermal process is a plasma process.

20. The method of claim 19, wherein the plasma process is an inductive coupled plasma process.

21. The method of claim 18, wherein the precursor material is a single material containing all elements contained in the resulting ionically conductive particles.

22. The method of claim 18, wherein the precursor material is a mixture of materials containing all elements contained in the resulting ionically conductive particles.

23. The method of claim 18, wherein both the precursor material and ionically conductive particles have a composition comprising lithium and oxygen atoms in combination with at least one element selected from the group consisting of silicon, phosphorus, nitrogen, and transition metal atoms.

24. The method of claim 18, wherein both the precursor material and ionically conductive particles have a composition comprising lithium, silicon, and oxygen atoms in combination with at least one element selected from the group consisting of phosphorus, nitrogen, and transition metal atoms.

25. The method of claim 18, wherein both the precursor material and ionically conductive particles have a composition comprising lithium, silicon, phosphorus, and oxygen atoms in combination with at least one element selected from the group consisting of nitrogen and transition metal atoms.

26. The method of claim 18, wherein both the precursor material and ionically conductive particles have a composition comprising lithium, silicon, phosphorus, oxygen, and nitrogen atoms.

27. The method of claim 18, wherein the precursor material, while at least partially vaporized, is subjected to a sufficiently rapid cooling process to render the ionically conductive particles at least partially amorphous.

* * * * *